United States Patent [19]

Ryu

[11] Patent Number: 5,812,873

[45] Date of Patent: Sep. 22, 1998

[54] DATA DECODING METHOD AND SYSTEM

[75] Inventor: Tadanori Ryu, Ikeda, Japan

[73] Assignee: Ricoh Company, Ltd., Tokyo, Japan

[21] Appl. No.: 564,536

[22] Filed: Nov. 29, 1995

[30] Foreign Application Priority Data

Dec. 9, 1994 [JP] Japan .................................. 6-306540
Jun. 20, 1995 [JP] Japan .................................. 7-153513
Sep. 5, 1995 [JP] Japan .................................. 7-227802

[51] Int. Cl.[6] ............................................ G06F 13/00
[52] U.S. Cl. ........................... 395/822; 395/842; 395/834; 341/143
[58] Field of Search .................................. 395/800, 410, 395/821, 842, 846, 885, 888, 800.43, 200.42, 427, 442, 429, 834, 876, 854, 822, 384; 358/426, 296; 341/50, 86, 106, 143

[56] References Cited

U.S. PATENT DOCUMENTS

| | | | |
|---|---|---|---|
| 4,625,730 | 12/1986 | Fountain et al. | 128/903 |
| 4,887,224 | 12/1989 | Okano et al. | 358/261.4 |
| 5,177,480 | 1/1993 | Clark | 341/51 |
| 5,359,420 | 10/1994 | Kim | 348/384 |
| 5,414,686 | 5/1995 | Iitsuka | 369/48 |
| 5,446,557 | 8/1995 | Haze | 358/444 |
| 5,550,363 | 8/1996 | Obata | 235/462 |
| 5,627,650 | 5/1997 | Nosaki et al. | 358/296 |

FOREIGN PATENT DOCUMENTS 4286289 12/1992 Japan .............................. H04N 5/92

*Primary Examiner*—Mehmet B. Geckil
*Attorney, Agent, or Firm*—Cooper & Dunham LLP

[57] ABSTRACT

An address generating circuit generates addresses. A decoder reads compressed data from a recording medium according to the addresses supplied by the address generating circuit and decodes thus-read data. An address switching circuit selects one of an address supplied by the address generating circuit and an address supplied from an external address bus. A data switching circuit selects one of data supplied from the recording medium and data supplied by the decoder. The decoder circuits enters one of a through mode and a decoding mode, input data being output as it is in the through mode, input compressed data being decoded and the thus-decoded data being output in the decoding mode. When an address relevant to the recording medium is given externally, the decoder circuit enters the through mode and data thus read out from the recording medium is output to the data bus, and when an address relevant to the recording medium is given from the address generating circuit, the decoder circuit enters the decoding mode, reads compressed data from the recording medium, decodes it and outputs the decoded data to the data bus.

12 Claims, 19 Drawing Sheets

DATA DECODING METHOD AND SYSTEM

BACKGROUND OF THE INVENTION

1. Field of the Invention

The present invention relates to a data decoding method and data decoding system for decompressing image data and so forth which had a data compressing operation performed thereon and was thus compressed. In particular, the present invention relates to compressed-data decoding method and decoding system used in a game machine and so forth using microcomputers.

2. Description of the Related Art

FIG. 1 shows a general block diagram of a game machine, in the related art, using a microcomputer. In the figure, the game machine includes a game machine body 1, a program cartridge 2 and a CRT display 3.

The game machine body 1 includes a microcomputer including a CPU 10, a direct-memory-access controller (DMAC) 11, a random-access memory (RAM) 12 to be used as a work area of the CPU 10, a picture processing unit (PPU) 13 and a video RAM (VRAM) 14. Further, a system bus 15 has the CPU 10, DMAC 11, RAM 12, and PPU 13 connected thereto.

For example, the PPU 13 reads a frame (one screen) of image data in synchronization with vertical and horizontal scanning operations of the CRT display 3. This frame of image data is written in one image area of the VRAM 14 and then used for displaying a relevant image on the CRT display 3 through the VRAM 14. When the frame of image data is being used for the display, another frame of image data is being temporarily written in another image area of the VRAM 14, the thus-written frame of image data being subsequently used for displaying another relevant image.

The program cartridge 2 is inserted in a slot (not shown in the figure) provided on the game machine body 1 when the game machine is used. This cartridge 2 contains a ROM 20 and a RAM 21. A game operation program and so forth are previously written in the ROM 20, and the RAM 21 is used for storing, for example, the progress of a game operation, a game score result and so forth and has a battery 22 as a backup power source for the RAM 21.

Recently, many demands occur, in such a game machine, such as an image of a moving picture be displayed on a CRT. Accordingly, the amount of data to be stored in a ROM such as the ROM 20 of the program cartridge 2 shown in FIG.1 is very large. The ROM should have a very large capacity for storing such a very large amount of data. In order to reduce a required capacity of the ROM, image data or the like is compressed before being stored in the ROM.

If image data or the like is compressed and then stored in the ROM 20 of the program cartridge 2, the CPU 10 of the game machine body 1 is used for decoding or decompressing the image data and so forth which was thus compressed and then stored in the ROM 20. Specifically, the DMAC 11 transfers the data from the ROM 20 of the program cartridge 2 to the RAM 12. Then, the CPU 10 decodes the data in the RAM 12 using the RAM 12 as the work area, and sends the thus-decoded data to the PPU 13, the decoded data being thus used for displaying relevant images on the CRT 3.

However, in this method, time is required for transferring and decoding the compressed data before displaying the relevant images on the CRT. Thus, there is a delay time in displaying the relevant image.

Japanese Laid-Open Patent Application No.4-286289 discloses a decoder circuit. Image data of moving pictures is compressed and then stored in a CD-ROM. When the moving pictures are displayed, the decoder circuit reproduces and decodes the compressed and stored image data to the original image data. The thus-obtained original data is then used for displaying the moving pictures.

This disclosed decoder circuit is provided with a work ROM for having the compressed data supplied thereto from the CD-ROM, a DSP for performing a primary decoding operation on the data which has been transferred in a DMA manner from the work RAM, a work RAM to which the data which has had the primary decoding operation performed thereto is transferred in the DMA manner, a PPU to which the data in this work RAM is transferred in the DMA manner and which performs a secondary decoding operation on the thus-transferred data, and a DMAC for performing the transfer operation in the DMA manner. Data which has been obtained as a result of decompressing the compressed data is then obtained from the PPU.

However, this decoder circuit transfers in the DMA manner the data read out from the CD-ROM to the work RAM, and then the data in the work RAM is further transferred in the DMA manner to the DSP. Then, the DSP decodes the thus-transferred data and the thus-decoded data is further transferred in the DMA manner to the work RAM. Thus, a plurality of transferring operations in the DMA manner is performed and thus a very complex control operation is performed.

SUMMARY OF THE INVENTION

An object of the present invention is to provide a system by which the above-mentioned problems may be eliminated. Specifically, it is possible to apparently eliminate time required for a decoding operation, and thus prevent a delay of time in displaying images. Thereby, an image displaying operation can be smoothly performed.

Another object of the present invention is to provide a decoding method and a decoding system by which it is possible to obtain data, as a result of an accessing operation being performed, which has been decoded directly from a program cartridge.

A data decoding method according to the present invention comprises the steps of:

a) causing a decoding circuit to enter a decoding mode when accessing a recording medium to read compressed data,
   in said decoding mode, said decoding circuit reading and decoding said compressed data and supplying decoded data; and b) causing said decoding circuit to enter a through mode when said decoding circuit has processed a predetermined amount of compressed data,
   in said through mode, said decoding circuit reading data from said recording medium but performing no operation on thus-read data and supplying it as it is.

A data decoder circuit according to the present invention comprises:

an address generating circuit generating addresses as a result of either incrementing or decrementing a given address;

a decoder reading compressed data from a recording medium according to the addresses supplied by said address generating circuit, decoding thus-read data and outputting thus-decompressed data;

an address switching circuit selecting one of an address supplied by said address generating circuit and an address supplied from an external address bus, and outputting the thus-selected address;

a data switching circuit selecting one of data supplied from said recording medium and data supplied by said decoder, and outputting the thus-selected data to a data bus; and wherein;

said decoder circuit enters one of a through mode and a decoding mode, input data being output as it is in said through mode, input compressed data being decoded and thus-decoded data being output in said decoding mode; and when an address relevant to said recording medium is given externally, said decoder circuit enters said through mode and data thus read out from said recording medium is output to said data bus, and when an address relevant to said recording medium is given from said address generating circuit, said decoder circuit enters said decoding mode, thus reads compressed data from said recording medium, decodes it and outputs thus-decoded data to said data bus.

It is preferable that in said decoder circuit, an amount of data to be supplied therefrom is previously set and said decoder circuit enters said through mode when said decoder circuit has supplied said amount of data.

It is preferable that the decoder circuit further comprises:

an internal memory; and a mapping memory arbitrarily setting an address map including addresses relevant to said internal memory; and wherein said data switching circuit selects one of data from said internal memory, data from said recording medium and data from said decoder.

It is preferable that:

a start address of the compressed data is previously set;

said decoder circuit outputs the decoded data and reads the compressed data from said recording medium only when an address the same as said start address is given; and said decoder circuit enters said through mode when an address the same as said start address is not given.

It is preferable that;

said recording medium stores both compressed data and non-compressed data;

a start address of said compressed data and non-compressed data is previously set;

when the previously set address is given, said decoder circuit starts reading said compressed data and non-compressed data and decodes it;

in a first reading cycle or in a first plurality of reading cycles, said decoder circuit outputs said non-compressed data, and then outputs data obtained as a result of decoding said compressed data.

Another data decoder circuit according to the present invention comprises:

an address generating circuit generating addresses as a result of either incrementing or decrementing a given address;

a decoder reading compressed data from a recording medium according to the addresses supplied by said address generating circuit, decoding thus-read data and outputting the thus-decompressed data;

an address switching circuit selecting one of an address supplied by said address generating circuit and an address supplied from an external address bus, and outputting thus-selected address;

a data switching circuit selecting one of data supplied from said recording medium and data supplied by said decoder, and outputting the thus-selected data to a data bus; and a detecting circuit detecting what address flows through said address bus; and wherein:

said decoder circuit is previously set to perform a decompressing operation when a DMA operation is performed;

when said detecting circuit detects an address relevant to said DMA operation, the address supplied by said address generating circuit is used as an address according to which data is read out from said recording medium, the thus-read compressed data is decoded, and output to said data bus;

when said detecting circuit does not detect an address relevant to said DMA operation, the address supplied via said address bus is used as an address according to which data is read out from said recording medium, the thus-read data is output to said data bus as it is.

It is preferable that;

in response to instructions being given to enter said decoding mode, when detecting a given address relevant to a part other than said recording medium, said decoder circuit reads compressed data from said recording medium and starts decompressing it; and when detecting given DMA operation start instructions, said decoder circuit outputs thus-decoded data.

Another data decoder circuit according to the present invention comprises:

an address generating circuit generating addresses as a result of either incrementing or decrementing a given address;

a decoder reading compressed data from a recording medium according to the addresses supplied by said address generating circuit, decoding thus-read data and outputting thus-decompressed data;

an address switching circuit selecting one of an address supplied by said address generating circuit and an address supplied from an external address bus, and outputting thus-selected address;

a data switching circuit selecting one of data supplied from said recording medium and data supplied by said decoder, and outputting thus-selected data to a data bus; and a detecting circuit detecting what address flows through said address bus; and wherein:

said decoder circuits enters one of a through mode and a decoding mode, input data being output as it is in said through mode, input compressed data being decoded and thus-decoded data being output in said decoding mode; and in response to instructions being given to enter said decoding mode, when detecting a given address relevant to a part other than said recording medium, said decoder circuit reads compressed data from said recording medium and starts decompressing it;

when determining agreement of a given address with a previously set address, said decoder circuit outputs thus-decoded data; and when determining non-agreement of a given address with said previously set address, said decoder circuit enter said through mode.

Another data decoder circuit according to the present invention comprises:

a first plurality of registers in which addresses for reading compressed data are set;

a control register for controlling starting of a plurality of decoding operations having previously set priority orders respectively, said plurality of decoding operations relevant to said plurality of registers;

a second plurality of resisters in which transfer amounts are set relevant to respective ones of said first plurality of registers;

first and second address generating circuits outputting addresses as a result of incrementing or decrementing a given address;

first and second storage means storing compressed data read out from a recording medium according to the addresses output by said first and second address generating circuits;

a decoder reading compressed data from a recording medium according to the addresses supplied by said address generating circuit, decoding thus-read data and outputting thus-decompressed data;

an address switching circuit selecting one of an address supplied by said first or second address generating circuit and an address supplied from an external address bus, and outputting thus-selected address;

a data switching circuit selecting one of data supplied from said recording medium and data supplied by said decoder, and outputting thus-selected data to a data bus; and wherein:

said decoder circuits enters one of a through mode and a decoding mode, input data being output as it is in said through mode, input compressed data being decoded and thus-decoded data being output;

when an address is supplied from said external address bus, said decoder circuit enters said through mode;

when an address is supplied by said first or second address generating circuit, said decoder circuit enters said through mode, then, in response to instructions of start of said plurality of decoding operations, an address relevant to a high priority order is set in said first address generating circuit, then according to addresses supplied by said first address generating circuits, compressed data is read out from said recording medium and then stored in said first storage means, thus-stored data being read and decoded by said decoder, when said first storage means becomes full, from an address relevant to a subsequent priority order, said second address generating circuit supplies addresses, compressed data being then read out from said recording medium according to thus-supplied addresses and then stored in said second storage means, thus, after a relevant transfer amount of data relevant to a first specified address has been output, in a subsequent decompressing operation, said decoder starts reading data of said second storage means, said second address generating circuit generates addresses continuously to previous generation, compressed data being then read out from said recording medium using the thus-generated addressed, thus-read data being then stored in said second storage means, then, when said second storage means becomes full, from an address relevant to a subsequent priority order, said first address generating circuit supplies addresses, compressed data being then read out from said recording medium according to thus-supplied addresses and then stored in said first storage means.

It is preferable that said first and second storage means comprises FIFO memories. However, the first and second storage means may comprise a FIFO memory and a register.

Other objects and further features of the present invention will become more apparent from the following detailed description when read in conjunction with the accompanying drawings.

DESCRIPTION OF PREFERRED EMBODIMENTS

Figure 1:
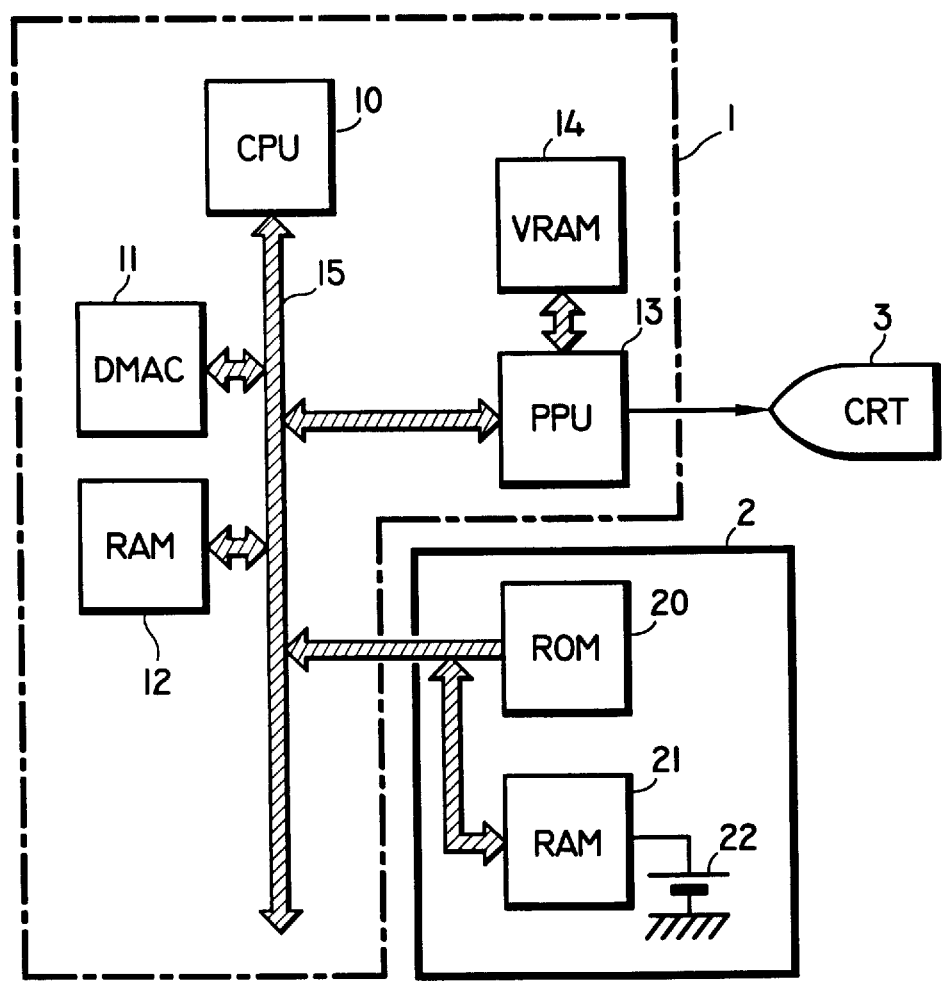
FIG. 1 shows a general block diagram of a game machine in the related art which uses a microcomputer.
Figure 2:
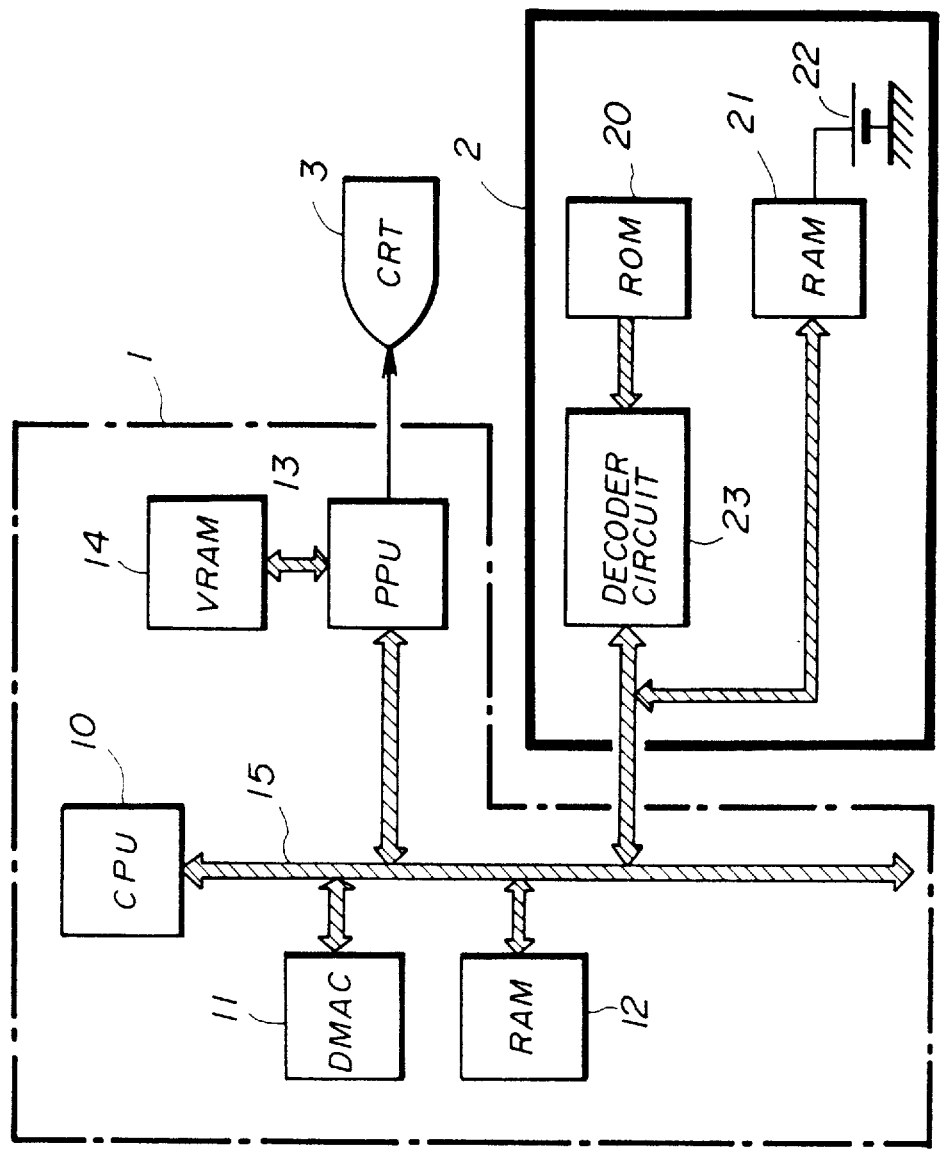
FIG. 2 shows a general block diagram of an example of a game machine using a microcomputer in each of first, second, third, forth, fifth and sixth embodiments of the present invention.

With reference to FIG. 2, a game machine, using a microcomputer, as a general arrangement in an each of the first, second, third, fourth, fifth and sixth embodiments of the present invention will now be described. In FIG. 2, reference numerals which are the same as those used in FIG. 1 are used for corresponding elements.

Similar to the game machine of the related art shown in FIG. 1, the game machine according to the present invention includes a game machine body 1, a program cartridge 2, and a CRT display 3.

Similar to the game machine in the related art, the game machine body 1 includes a microcomputer including a CPU 10, a DMAC 11, a work RAM 12, a PPU 13 and a VRAM 14. Further, a system bus 15 has the CPU 10, DMAC 11, RAM 12, and PPU 13 connected thereto.

For example, the PPU 13 reads a frame (one screen) of image data in synchronization with vertical and horizontal scanning operations of the CRT display 3. This frame of image data is written in one image area of the VRAM 14 and then used for displaying a relevant image on the CRT display 3 through the VRAM 14. When the frame of image data is being used for the display, another frame of image data is being temporarily written in another image area of the VRAM 14, the thus-written frame of image data being subsequently used for displaying another relevant image.

Further the program cartridge 2 is inserted in a slot (not shown in the figure) provided on the game machine body 1 when the game machine is used. This cartridge 2 contains a decoder circuit 23 as well as a ROM 20 and a RAM 21. A game operation program which has not been compressed and compressed image data are previously written in the ROM 20, and the RAM 21 is used for storing, for example, a progress of a game operation, a game score result and so forth and has a battery 22 as a backup power source for the RAM 21.

In the decoder circuit 23, it is possible to change between a through mode and a decoding mode. In the through mode, the decoder circuit 23 outputs input data as it is. In the decoding mode, the decoder circuit 23 decodes or decompresses input compressed data and then outputs thus-decoded data in real time. Specifically, the decoder circuit 23 accesses the ROM 20, reads data and then outputs the thus-read data as it is to the system bus 15 in the game machine body 1 in the through mode. In the decoding mode, the decoder circuit 23 reads the compressed data from the ROM 20, and decodes the thus-read data. Then, the decoder circuit 23 outputs the thus-decoded data to the system bus 15 in the game machine body 1. The mode changing operation is performed as a result of an accessing operation performed by the CPU 10.

Figure 3:
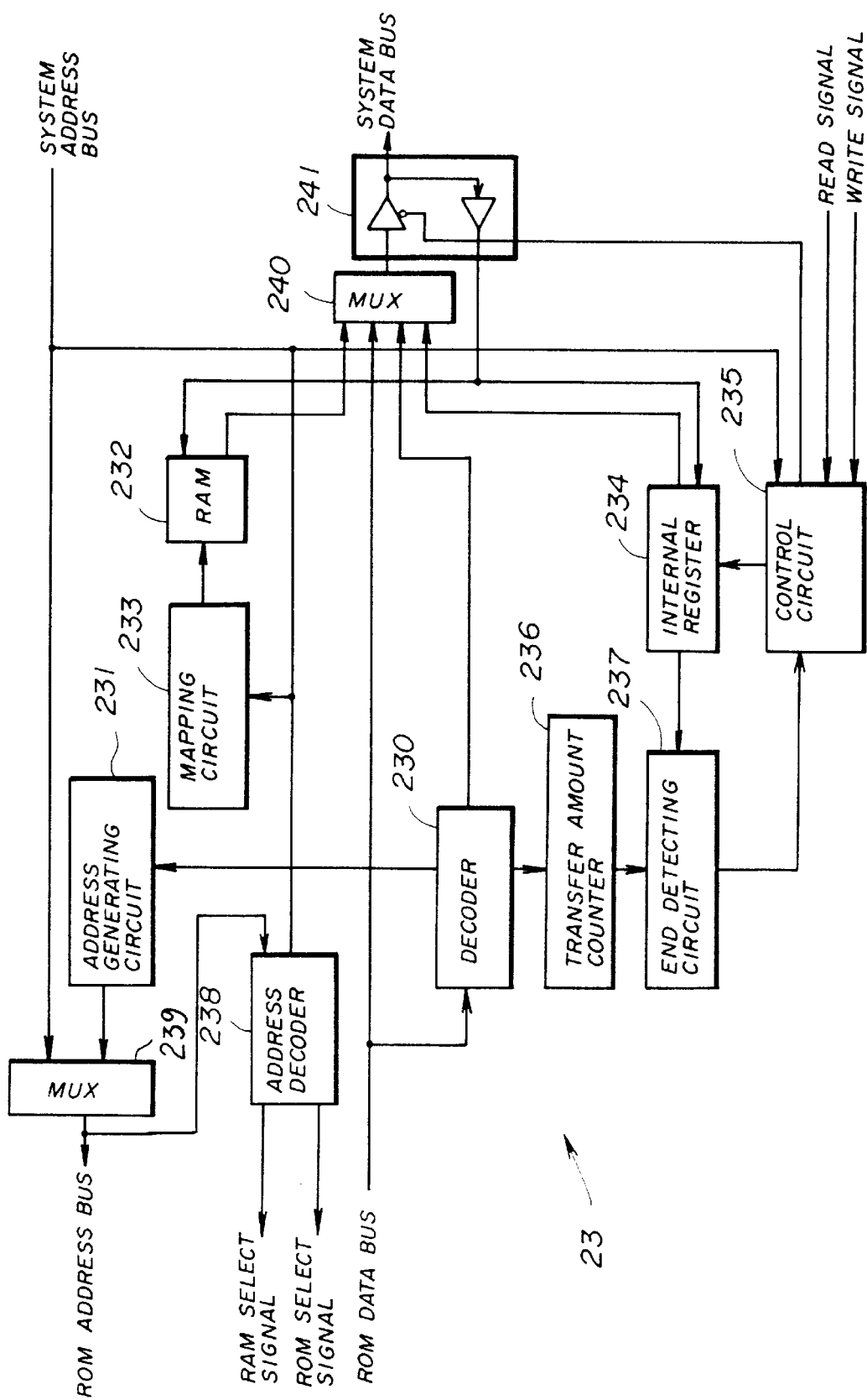
FIG. 3 shows a block diagram of a decoder circuit in the first embodiment of the present invention.

With reference to FIG. 3, the decoder circuit 23 in the first embodiment of the present invention will now be described.

The decoder circuit 23 includes a decoder 230 decoding compressed data, an address generating circuit 231 generating addresses to be used by the decoder 230 for reading in the compressed data stored in the ROM 20, and a small-capacity RAM 232 which the CPU 10 can freely access. The RAM 232 is a memory which can be always accessed externally of the decoder circuit 23.

Further, a mapping circuit 233 maps addresses for the above-mentioned RAM 232 onto arbitrary addresses for the ROM 20. An internal register 234 is provided with a storage region storing a first address of compressed data, a control register region, status register region and so forth. The internal register 234 is a memory which can be always accessed externally.

A control circuit 235 controls the whole decoder circuit 23. A transfer amount counter 236 counts an amount of data transferred after the start of a decoding operation. A end detecting circuit 237 detects agreement of a previously set transfer amount with the count value of the transfer amount counter 236 and, thus, the end of the decoding operation.

An address decoder circuit 238 outputs a chip select signal for selecting the ROM 20 or the battery-backup RAM 21. An address switching circuit 239 comprises a multi-plexer. This circuit 239, based on output of the decoder 230, selects address output from the address generating circuit 231 or output from a system address bus of the system bus 15, and supplies a selected one of the outputs to a ROM address bus of the ROM 20. The above-mentioned address output from the address generating circuit 231 is one which is used for reading data from the ROM 20 and then supplying it to the decoder 230.

A data switching circuit 240 comprises a multiplexer. This circuit 240 selects one of data from the ROM 20, data from the internal RAM 232, data from the decoder 230 and data from the internal register 234. The circuit 240 then supplies the thus-selected data to a system data bus of the system bus 15. A buffer circuit 241 switches between an input state from the system data bus and an output state to the system data bus.

In the first embodiment, when power is supplied, the decoder circuit 23 is in the through mode in which the ROM 20 can be accessed and thus data can be read out therefrom as it is, i.e., in the format in which it is stored in the ROM 20. At this time, the address switching circuit 239 of the decoder circuit 23 selects addresses transferred from the system address bus of the system bus 15, and supplies them to the ROM 20. Further, the data switching circuit 240 outputs either data of the ROM 20 or data of the internal RAM 232 to the system data bus of the system bus 15. This state is a state in which the CPU 10 can perform an ordinary a memory accessing operation on the ROM 20.

An operation of decoding compressed data which is stored in the ROM 20 will now be described.

The CPU 10 of the game machine body 1, in an initializing routine, reads a processing program for performing a DMA transfer operation from the ROM 20, and writes the thus-read program to the internal RAM 232 of the decoder 23. Further, for mapping the program at arbitrary ROM addresses of the ROM 20, the CPU 10 further writes, in the internal register 234 of the decoder 23, addresses of the RAM 232 at which the program is thus written.

Figure 5:
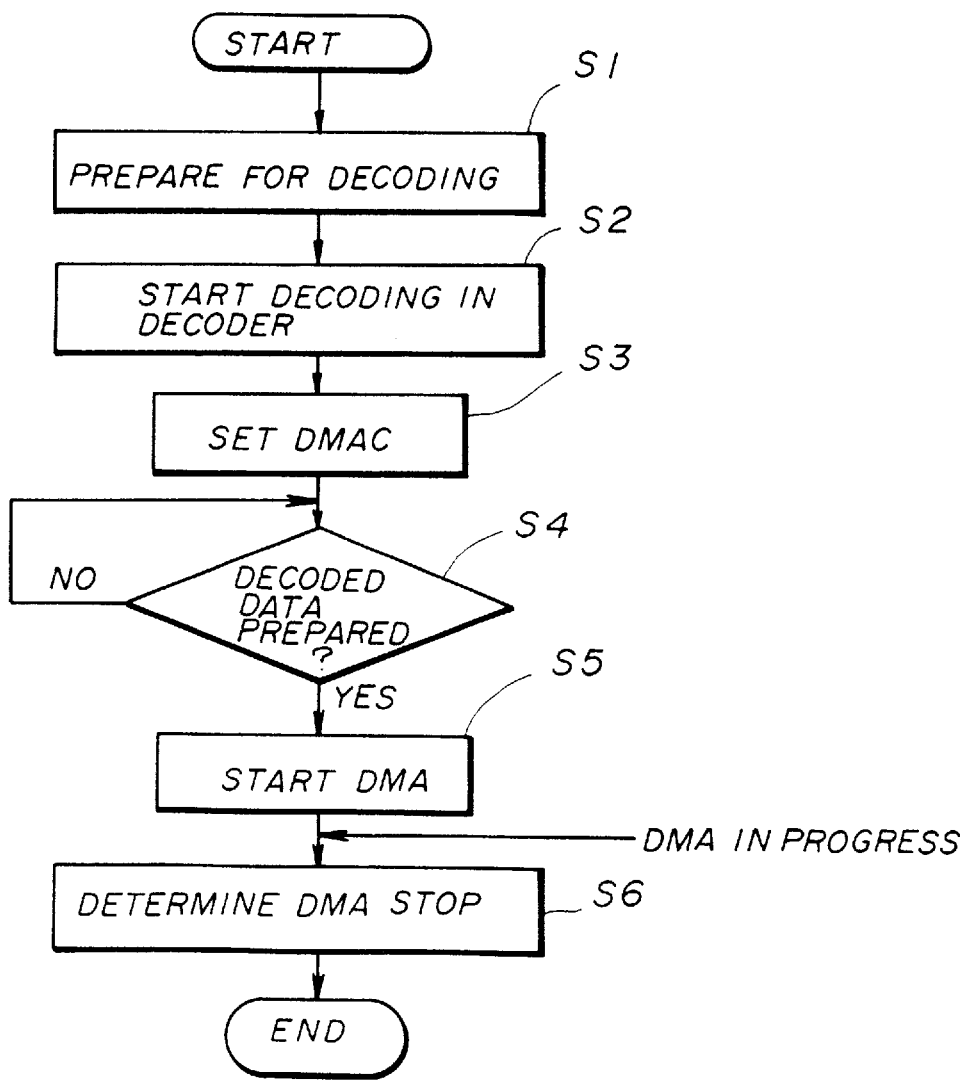
FIG. 5 shows a flowchart of a processing program executing in the decoder circuit in the first embodiment.

This processing program, according to which the DMA transfer operation of the decoded data is performed, will now be described in general with reference to FIG. 5.

When a decoding operation is started, a decoding start address is written in the internal resister 234 of the decoder circuit 23 and thus preparation of decoding is performed in S1. In S2, a decoding start bit is written in the internal resister 234, the decoder 230 starts the decoding operation, and a data transfer amount is set.

Then, setting of the DMA controller 11 is performed and the start address and transfer amount are set therein, in S3. In S4, it is determined whether or not the decoded data has been prepared for being transferred as a result of a decoding operation being performed. If it is determined that the decoded data has been prepared, a DMA operation is started in S5. Then, when it is determined that the DMA transfer operation is stopped in S6, the current operation is terminated.

Figure 4:
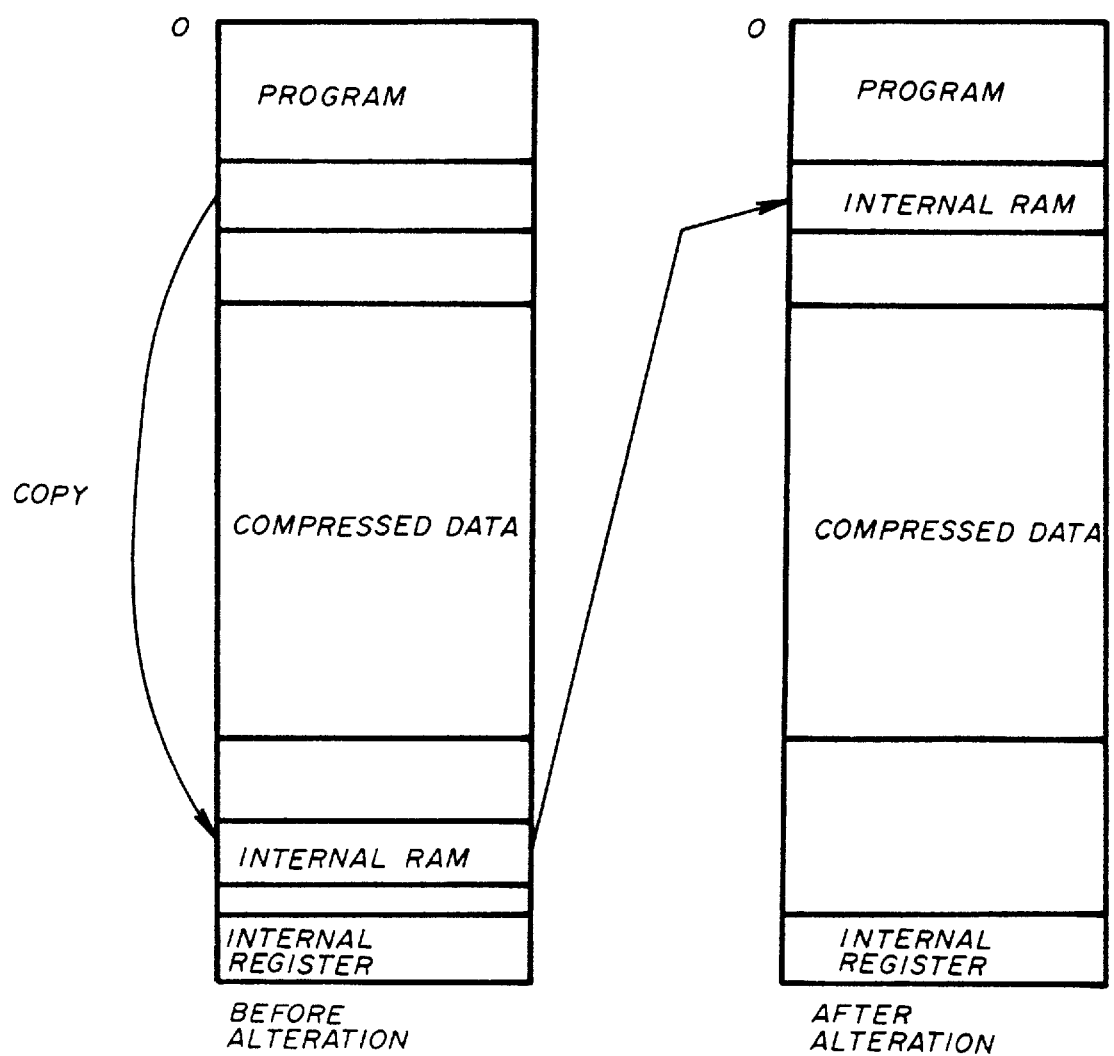
FIG. 4A shows an address map including address relevant to an internal RAM in the decoder circuit in the first embodiment before having mapping alteration performed thereto.
FIG. 4B shows the same after having the mapping alteration performed thereto.

With reference to FIGS. 4A and 4B, mapping states in the internal RAM 232 will now be described. Before mapping alteration is performed, addresses for the RAM 232 are located in a region for elements other than the ROM 20 as shown in FIG. 4A. Addresses of the processing program is located in a program region (an upper part of the map) in the address map. The processing program is copied to the internal RAM 232. Then, addresses of the internal RAM 232 are set in the internal register 234 of the decoder circuit 23 so that the addresses of the internal RAM 232 are mapped to addresses for the ROM 20. After the mapping alteration has been performed, the address map is such as that shown in FIG. 4B.

As a result, when the CPU 10 performs an accessing operation according to the address map shown in FIG. 4B, when attempting to access addresses relevant to the processing program in the ROM 20, the CPU 10 automatically accesses the addresses relevant to the internal RAM 232. Thus, the CPU 10 accesses the internal RAM 232 and thereby reads the processing program which was copied to the internal memory 232 as mentioned above. Thus, without changing addresses used by the CPU 10, the CPU 10 automatically accesses the internal RAM 232 and reads the processing program. Thus, although the CPU 10 cannot directly access the ROM 20 during the decoding operation and thus cannot directly read the processing program stored in the ROM 20, the CPU 10 reads the processing program stored in the internal RAM 232.

In fact, when decoding of compressed data stored in the ROM 20 is started, data read out from the decoder circuit 23 is only decoded data, and the processing program in the ROM 20 cannot be directly read. In order to read the processing program, as mentioned above, the processing program is moved to another region such as the internal RAM 232 and thus the CPU 10 can read the processing program therefrom. In a case where the decoder circuit 23 does not have the internal RAM 232 or the like, the processing program may be instead copied to the work RAM 12 and the processing program may be read therefrom.

If the processing program is present in the internal RAM 232 of the decoder circuit 23, the CPU 10 can obtain instructions from the internal RAM 232 even after the decoder circuits enter the decoding mode. Therefore, apparently, the condition is the same as that in which the CPU 10 obtains instructions directly from the RAM 20.

A specific operation will now be described. The CPU 10 writes a start address of compressed data to be decoded and an amount of data to be transferred in the internal register 234 of the decoder circuit 23. Then, the CPU 10 writes the decoding start bit in the control register region of the internal register 234 of the decoder circuit 23 and thus instructs the decoder circuit 23 to start a decoding operation. Then, setting of the DMAC 11 is performed in a predetermined manner.

A time is required for the decoder circuit 23, after starting the decoding operation, to enter a state in which the decoder circuit 23 outputs the decoded data continuously. Therefore, before starting the DMA transfer of the decoded data, it is necessary to determine whether or not the decoder 230 has finished output preparation, by reading the status register region of the internal register 234. If the output preparation has been finished, the CPU 10 instructs the DMAC 11 in the game machine body 1 to start the DMA transfer operation.

However, there may be a case where the decoder circuit 23 can finish the decoded data output preparation during a time required for the CPU 10 to complete setting of the DMAC 11 in the predetermined manner after the decoding start instructions have been supplied by the CPU 10. In this case, reading of the status register region of the internal register 234 is not necessary.

When the decoder circuit 23 starts the decoding operation, the circuit 23 enters the decoding mode. The address switching circuit 239 inside the decoder circuit 23 selects the address output from the address generating circuit 231, and supplies it to the address bus relevant to the ROM 20. Further, the data switching circuit 240 selects either output data of the decoder 230 or data from the internal RAM 232 and supplies a selected one to the system data bus of the external system bus 15.

The address generating circuit 231 is successively incrementing an address from the start address of the compressed data, which was previously written in the internal register 234, according to instructions supplied from the decoder 230, and outputting it. The decoder 230 thus uses the address generating circuit 231, reads the compressed data from the ROM 20 and then decodes the compressed data. If the data output preparation has been finished, a status bit indicating the finish of the data output preparation is set in the internal register 234. When the DMA transfer operation is then started and then the decoder circuit 23, according to a data read signal, supplies the decoded data to the system data bus of the external system bus 15. An amount of transferred data is counted by the transfer amount counter 236. A count value of the transfer amount counter 236 is reset to be zero when the decoding operation is started.

The end detecting circuit 237 uses the transfer amount previously written in the internal register 234 and the count value of the transfer amount counter 236, and detects the end of the transfer operation. If the end of the transfer operation is thus detected, the control circuit 235 terminates the decode mode and returns the decoder circuit 23 to the through mode.

After transfer of the previously set data is completed, the DMA transfer operation is terminated. After the termination of the DMA transfer operation, according to the processing program, it is determined that the DMA transfer operation is finished and an operation according to the processing operation is terminated. However, this determination of the completion of the DMA transfer operation is not necessarily required.

In the first embodiment, the decoder circuit 23 is provided inside the program cartridge 2. Accordingly, data being transferred from the program cartridge 2 to the game machine body 1 is data obtained as a result of decoding the compressed data. Therefore, the data transfer can be performed in a manner in which apparently non-compressed data stored in a ROM is transferred. Therefore, an arrangement of the game machine body 1 may be the same as that in the related art. The decoding operation and data transfer operation associated therewith is performed in the decoder circuit 23 individually as described above. As a result, the CPU 10 may completely disregard the decoding operation and associated data transfer operation. As a result, no delay of image display occurs and thus smooth image display can be performed.

Further, data read out from the program cartridge 2 is data obtained as a result of decoding or decompressing the compressed data in the ROM 20. The compressed data is not directly relevant to addresses of non-compressed original data. As a result, copying the data from the ROM 20 of the program cartridge 2 is very difficult and, thus, illegal copying can be prevented.

Figure 6:
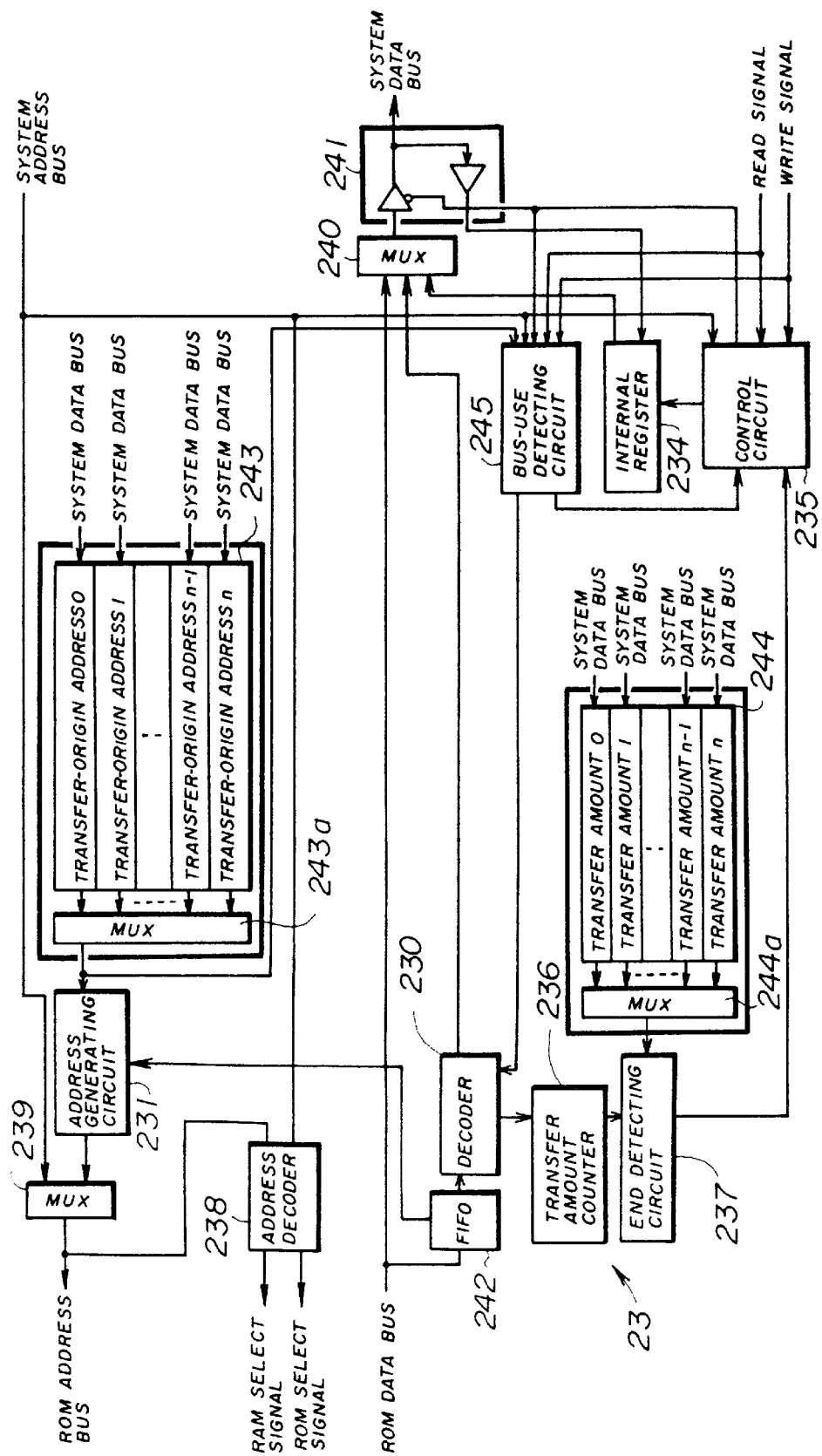
FIG. 6 shows a block diagram of a decoder circuit in the second embodiment of the present invention.

With reference to FIG. 6, the decoder circuit 23 in the second embodiment of the present invention will now be described. In FIG. 6, the same reference numerals as those used in the decoder circuit in the first embodiment are used for the corresponding elements.

Similar to the above-described first embodiment, according to addresses generated by the address generating circuit 231, compressed data is read out from the ROM 20. The thus-read out compressed data is stored in a FIFO memory 242. The compressed data thus stored in the FIFO memory 242 is supplied to the decoder 230 which then decodes or decompresses the thus-supplied compressed data.

The CPU 10 accesses the ROM 20 and reads the compressed data in the ROM 20. The decoder circuit 23 in the second embodiment decompresses the thus-read compressed data and then transfers it by a DMA operation to the game machine body 1. For this purpose, the CPU 10 supplies transfer-origin address data to an address register group 243 in the decoder circuit 23 via the system bus. The transfer-origin address data indicates addresses in the ROM 20 from which the compressed data should be read out, decompressed, and transferred to the game machine body 1. The transfer-origin address data thus supplied to the address register group 243 is then written therein.

The address register group 243 is made of a plurality of registers for a predetermined plurality of DMA channels which the DMAC 11 selectively uses appropriately and thus improves data transfer efficiency. Data of a transfer-origin address is supplied from the CPU 10 for performing a DMA transfer operation using a DMA channel among the plurality of DMA channels. The thus-supplied transfer-origin address data is written in a register, among the plurality of registers, relevant to the above-mentioned DMA channel. Thus, data of a plurality of transfer-origin addresses are written in the plurality of registers of the address register group 243, respectively. The thus-written transfer-origin address data is then supplied to the address generating circuit 231 via the multiplexer 243a.

Similarly, the CPU 10 supplies transfer amount data indicating an amount of data to be transferred by a DMA operation to an internal register group 244 in the decoder circuit 23, and writes it thereto. The register group 244 is made of a plurality of registers for the predetermined plurality of DMA channels. A transfer amount of data is supplied from the CPU 10 for performing the DMA transfer operation using a DMA channel among the plurality of DMA channels. The thus-supplied transfer amount data is written in a register, among the plurality of registers, relevant to the above-mentioned DMA channel. Thus, data of a plurality of data transfer amounts are written in the plurality of registers of the register group 244 respectively. The thus-written amount of data transferred is then supplied to the end detecting circuit 237 via the multiplexer 244a.

The amount of data transferred after a decoding operation starts is counted by the transfer amount counter 236 and a count value of the counter 236 is supplied to the end detecting circuit 237. The end detecting circuit determines that the decoding is finished by determining agreement of a transfer amount supplied by the register group 244 with the count value of the counter 237.

The above-described register groups 243 and 244 have addresses the same as those of a transfer-origin address register and transfer amount register in the DMA controller 11 in the game machine body 1, outside the decoder circuit 23. The register groups 243 and 244 are registers on which only a writing operation can be performed. Therefore, when the CPU 10 attempts to read data from the address registers or transfer amount registers in the DMAC 11 and thus supplies the relevant addresses, collision of data read out from the registers in the DMAC 11 and the registers in the decoder circuit 23 is prevented.

The decoder circuit 23 in the second embodiment includes a bus-use detecting circuit 245 for detecting performance of a DMA operation as a result of monitoring data flowing through the system address bus. Thus, data supplied from the CPU 10 of the game machine body 1 is monitored. Further, the decoder circuit 23 determines whether or not addresses indicated by data in the system address bus agree with specified ones.

An operation of the decoder circuit 23 in the second embodiment will now be described.

Figure 7:
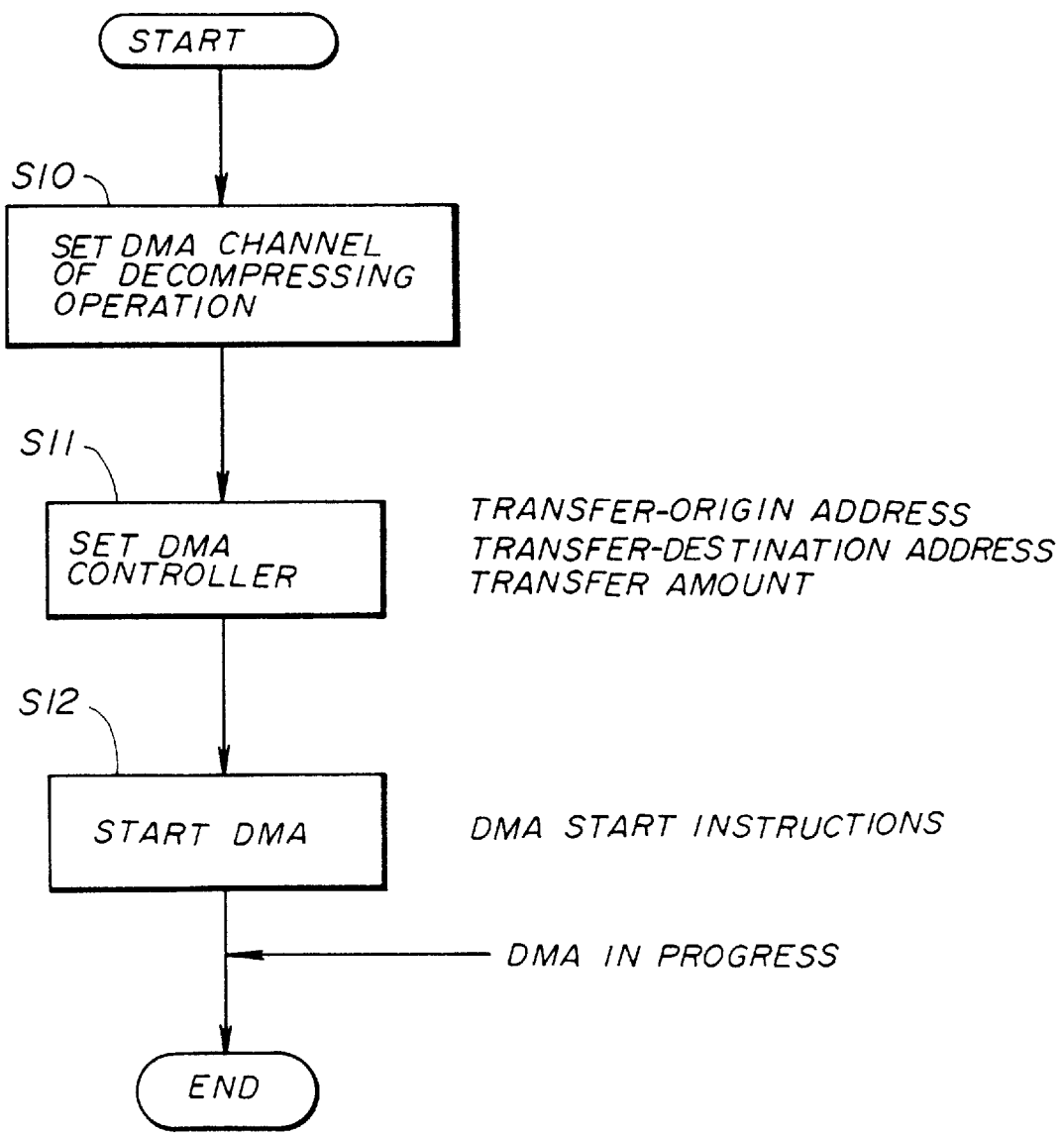
FIG. 7 shows a flowchart of a processing program executing in the decoder circuit in the second embodiment.

The CPU 10 in the game machine body 1 performs the initial setting shown in FIG. 7 for decompressing image data stored in the ROM 20 and transferring it by the DMA operation.

DMA channels among the plurality of DMA channels are set in the internal register 234 in the decoder circuit 23 in S10, through which channels desired decompressing operations will be performed. This setting should be performed only when the set value should be changed.

Then, transfer-origin addresses, transfer-destination addresses and data indicating transfer amounts are set in the DMAC 11 in S11. At this time, transfer-origin address data and transfer amount data, the same as those set in the DMAC 11, are written in the transfer-origin address register group 243 and transfer amount register group 244. A transfer-origin address is incremented or decremented in an ordinary DMA transfer operation. However, a transfer-origin address in a DMA transfer operation using a DMA channel for performing a decompressing operation is neither incremented nor decremented but fixed. In order to cause such an operation to be performed, the DMAC 11 is appropriately set.

The CPU 10 should fix an address to be used for performing a memory accessing operation accompanied by a data decompressing operation. The address generating circuit 231 increments the thus-fixed address in a manner appropriate to the data density of the compressed data in the ROM 20. There may be a case where there is a possibility that an operation of accessing the ROM 20 for original data while a memory accessing operation accompanied by the data decompressing operation is being performed. In such a case, it is necessary to determine whether or not a memory accessing operation currently being performed is that accompanied by the data decompressing operation. By maintaining to supply only the start address of the compressed data as mentioned above, it is possible to determine that the currently performed memory accessing operation is that accompanied by the data decompressing operation. Accordingly, while a DMA operation is being performed, which operation is started using hardware, has a high priority and is not accompanied by the data decompressing operation and while the CPU is performing a data transfer operation, it is necessary to fix the address to be used for the memory accessing operation accompanied by the data decompressing operation.

In a case where only a single DMA operation thus using a single DMA channel is performed, the decoder circuit 23 should have only one transfer-origin address register and one transfer amount register. Further, there may be a case where an address for setting a transfer-origin address is the same as an address for setting a data transfer amount information. In this case, setting the transfer-origin address data and data transfer amount information in the DMAC 11 may be performed according to a predetermined procedure, and also, the decoder circuit 23 may have a function such that the transfer-origin address data and data transfer amount information are automatically detected and obtained by the decoder 23 according to the same predetermined procedure.

Then, the CPU 10 instructs the DMAC 11 to start a DMA operation in S12. In the embodiment, the CPU 10 can specify DMA operations using the plurality of DMA channels. The DMA transfer operations performed using the plurality of DMA channels may include DMA operations for decompressing operations and ordinary simple DMA transfer operations in a mixed manner. Further, when the DMAC 11 receives instructions of DMA operation start, the DMAC requests the CPU 10 to allow use of the bus. After the CPU 10 gives the bus to the DMAC 11, the DMAC 11 starts the DMA operation.

When the DMA operation is started, a predetermined sequence starting from writing of an operation start command in the DMAC 11 by the CPU 10 is constantly executed. Therefore, in order to previously detect start of a DMA operation, the decoder circuit 23 detects the operation start instructions supplied to the DMAC 11 as a result of detecting data passing through the system address bus. This detection can be performed by detecting a certain specific address for instructing the DMA operation start, for example, an address at which the CPU 10 writes data in a control register in the DMAC 11.

In this second embodiment, it is also possible that the CPU supplies data indicating a DMA channel to be used or obtain the same data from the ROM 20 before the decoding operation is actually started. In this case, the decoder circuit 23 can previously know the DMA channel to be used.

If there is no such specific address, by detecting a start of a predetermined step in a predetermined setting sequence, the DMA operation start may be detected. If none of the channels used for DMA operations are DMA channels previously set to be used for decompressing operations, the decoder circuit 23 does not start any operation.

With reference to FIGS. 8A, 8B, 8C, 8D, 8E, 8F, 8G and 8H, DMA operation using the decoding circuit 23 in the second embodiment will now be described.

An address enable signal, supplied by the CPU 10, shown in FIG. 8A, has a low level, data so as to make data in an address bus effective. Address output from the decoder circuit 23 shown in FIG. 8F indicates addresses relevant to the ROM 20 connected to the decoder circuit 23. Decoder input data shown in FIG. 8H is data which is supplied from the ROM 20 in response to the addresses relevant to the ROM 20 being supplied from either the external system address bus or the internal address generating circuit 231.

In the time chart shown in FIGS. 8A–8H, after the DMAC 11 has instructed a DMA operation start, one cycle of instruction retrieval is performed and thus ROM data is supplied to the system data bus as shown in FIG. 8E from the ROM 20 as a result of a ROM address being supplied to the system address bus as shown in FIG. 8B. Then, a DMA operation is performed and thus the decoded data is supplied to the system data bus as shown in FIG. 8E. The above-mentioned instruction retrieval depends on a system of a DMA operation start procedure currently being used and there may be a case where instruction retrieval is omitted.

In this time chart, a solid-line arrow indicates a period in which data is output using addresses supplied from the external system address bus. A broken-line arrow indicates a period in which data is output using addresses supplied from the internal address generating circuit 231.

An operation of the decoder circuit 23 in the second embodiment will now be described.

The decoder circuit 23 may detect start of a DMA operation for a decompressing operation by detecting an operation start command being supplied to the DMAC 11 from the CPU 10. If so, a DMA channel of a decompressing operation is selected from among a predetermined plurality of DMA channels. Predetermined DMA operations using the plurality of DMA channels have predetermined priority orders previously set therefor, respectively. The DMA channel to be thus selected is one having the highest priority order among DMA channels for decompressing operations. Then, a transfer-origin address relevant to the thus-selected DMA channel is supplied to the address generating circuit 231 via the multiplexer 243a from the transfer-origin address register group 243. Thus, an address of the address generating circuit 231 is set. Thereby, a decoding operation is started. Further, the transfer amount register group 244 supplies output of a resister relevant to the DMA channel selected as mentioned above.

A control registers is included in the internal registers 234 and controls operation of the multiplexers 243a and 244a. Thus, start of decoding operations is controlled according to the predetermined priority order.

Figure 8:
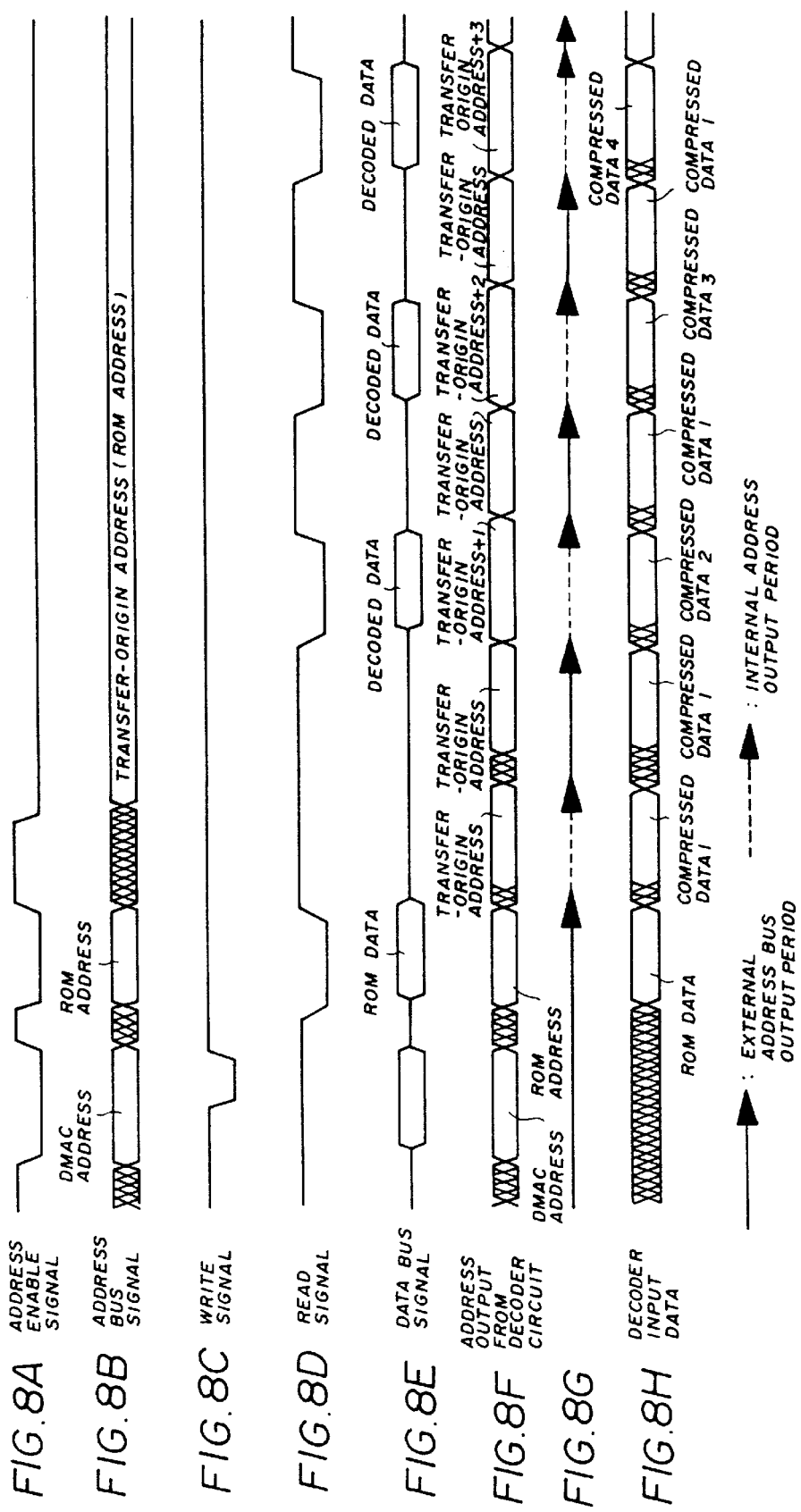
FIGS. 8A, 8B, 8C, 8D, 8E, 8F, 8G and 8H show time charts of a DMA operation start in the decoding circuit in the second embodiment.

Immediately after the DMA operation has been started, an item of compressed data, indicated as compressed data 1 in FIG. 8H, is read out from the ROM 20 according to the address supplied by the address generating circuit 231. The thus-read data is written in the FIFO memory 242. The decoder 230 reads in the data from the FIFO memory 242 and decodes it. The thus-decoded data is supplied to the system data bus as shown in FIG. 8E. Then, the decoder circuit 23 enters the through mode again and thus the address output to the ROM 20 includes addresses supplied via the external system address bus. The time the decoder 23 is in the through mode is indicated by the solid-line arrow in FIG. 8.

At the beginning of each memory access cycle of the DMA operation, the decoder thus enters the through mode. Then, the bus-use detecting circuit 245 thus uses an address which is supplied by the CPU 10 and flows through the system address bus. The bus-use detecting circuit 245 thus determines whether or not the thus-obtained address is the same as the previously set transfer-origin address relevant to the DMA channel selected as mentioned above. That is, whether the thus-obtained address is the same as the address supplied by the register previously selected from among the transfer-origin address register group 243 at the beginning of the DMA operation. If the address obtained from the system address bus is the same as the selected transfer-origin address, the data switching circuit 240 selects data from the decoder 230 and outputs it. Simultaneously, according to the address from the address generating circuit 231, a subsequent item of compressed data (compressed data 2 in FIG. 8H) is read in from the ROM 20.

If the address obtained from the system address bus is not the same as the selected transfer-origin address, the decoder circuit 23 enters the through mode. The address supplied via the system address bus is used to access the ROM 20. The data switching circuit 240 selects the data thus read out from the ROM 20. The data read out from the ROM 20 is supplied to the system data bus as it is, i.e., in the absence of a decompressing operation. Thus, the game machine body 1 can read in the data from the ROM 20. If the DMA operation, which should be performed first, is an ordinary DMA operation and not a DMA operation for decompressing operation, a decoding operation of the decoder circuit 23 is halted and the DMA operation is performed in the through mode.

The end detecting circuit 237 determines agreement of a count value of the transfer amount counter 236 with a value from the transfer amount register group 244. Thus, the circuit 237 determines termination of the decoding operation using the current DMA channel.

In the above-described first embodiment, when decoding of compressed data stored in the ROM 20 is started, data read out from the decoder circuit 23 is only decoded data, and the processing program in the ROM 20 cannot be read. In order to read the processing program, the processing program is moved to another region and the CPU 10 can read the processing program. For this purpose, the decoder circuit 23 has the internal RAM 232, copies the processing program to the internal RAM, and instruction retrieval from the internal RAM is performed in the first embodiment.

In contrast to this, in the decoder circuit 23 in the second embodiment, an address which is sent from the CPU 10 via the system address bus at the beginning of a reading cycle of the DMA operation is used and an appropriate selection is performed between the decoding mode and through mode. As a result, the decoding circuit 23 enters the through mode when the processing program is read out from the ROM 20. Therefore, it is not necessary to copy the processing program or the like stored in the ROM 20 to the decoder circuit 23.

Further, the above-described method may be applied to a case where a DMA transfer operation is performed in which the start of the DMA transfer operation is not controlled by software. Such a transfer operation is, for example, one performed when some parameters for a display operation are transferred to the PPU 13 every horizontal synchronization signal of an image signal such as NTSC, PAL and so forth. Such a DMA operation is started for every horizontal synchronization signal, has a priority order higher than other DMA operations started by software, and thus should be performed after interrupting the other DMA operations of lower priority orders.

The decoder circuit 23 monitors, through the bus-use detecting circuit 245, address data flowing through the system address bus at each memory access cycle in a DMA operation. When the above-mentioned DMA operation having a higher priority order is requested to be performed, the DMAC 11 may supply relevant address data, other than address data previously set for the DMA operation, for the decompressing operation. The bus-use detecting circuit 245 then detects that the address data currently flowing through the system address bus is different from the previously set address data. As a result, the decoder circuit 23 enters the through mode and the DMAC 11 may access the ROM 20 at a relevant address, and performs the above-mentioned DMA operation, the start of which is not controlled by software.

Figure 9:
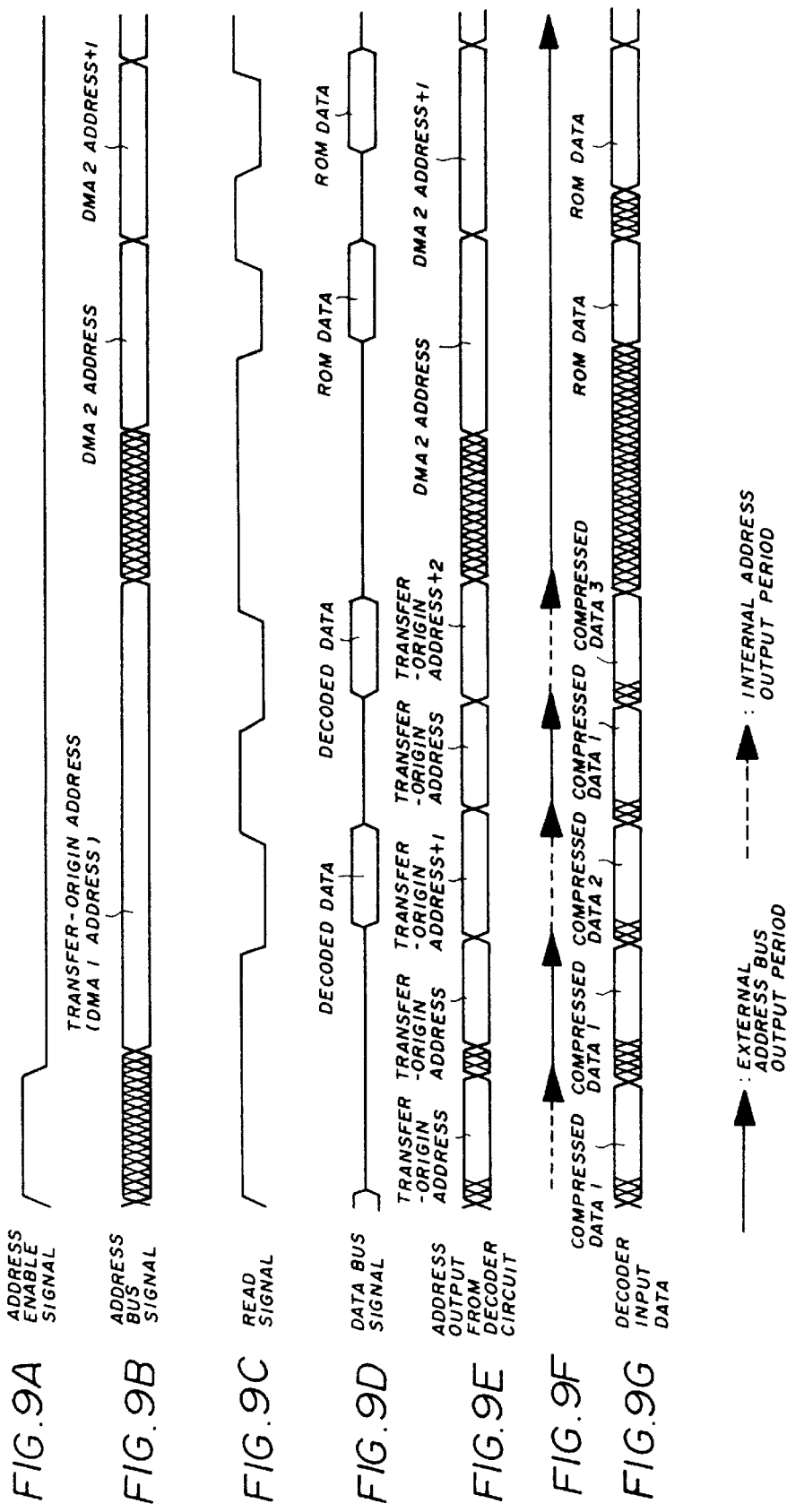
FIGS. 9A, 9B, 9C, 9D, 9E, 9F and 9G show time charts of a DMA operation in the decoding circuit in the second embodiment.

With reference to FIGS. 9A, 9B, 9C, 9D, 9E, 9F and 9G, such an operation will be described again. In the operation shown in these figures for example, a DMA operation for a decompressing operation is performed and thus decoded data is supplied to the system data bus as shown in FIG. 9D. Then, address data, indicated as DMA 2 address, different from predetermined transfer-origin address (DMA 1 address) is supplied to the system address bus as shown in FIG. 9A. As a result, the thus-performed DMA operation for decompressing operation is interrupted and another DMA operation having a higher priority order is started. Upon the other DMA operation being started, the decoder circuit 23 enters the through mode and ROM data is directly supplied to the system data bus as shown in FIG. 9A. In fact, when address data detected by the bus-use detecting circuit 245 is different from expected data, the data switching circuit 240 selects data from the ROM 20 and thus data from the ROM 20 is supplied to the system data bus.

Also in the above-mentioned DMA decoding operation, when the end detecting circuit 237 in the decoder circuit 23 determines agreement of a count value of the transfer amount counter 236 with a value of the transfer amount register group 244, the decoder circuit 23 determines that the current decoding operation using the DMA channel has been completed.

After the decoder 23 has completed the decoding of the previously set transfer amount of data, the decoder circuit 23 initializes the FIFO memory. Then, the transfer-origin address register group 243 supplies a transfer origin address of a register relevant to a DMA channel, among the DMA channels which were previously set, having a priority order subsequent to the highest one. The decoder 23 sets the thus-supplied address in the address generating circuit 231.

Then using the address, the decoder circuit 23 reads a first item of relevant compressed data from the ROM 20 as described above, and writes the thus-read compressed data to the FIFO memory 242. The decoder 230 then reads the thus-written compressed data from the FIFO memory 242 and decodes it. The thus-decoded data is supplied to the system data bus. Further, the transfer amount register group 244 also supplies transfer amount data of a resister relevant to the DMA channel having the subsequent priority order. If the FIFO memory 242 becomes full, reading of compressed data from the ROM 20, performed simultaneously with DMA transfer of decoded data, is stopped. Thus, in a manner similar to the fist DMAC 11 setting case, the current DMA operation using the DMA channel is performed. Then, similarly, all the DMA operations using DMA channels for decompressing operations are performed successively. Thus, the decoder circuit 23 completes predetermined decoding operations.

There may be a case where a DMA channel to be used is only a single channel and there is no possibility that any other DMA operation is inserted during a DMA operation using that single DMA channel. In this case, it is not necessary to insert the through mode at the beginning of each memory access cycle during the DMA operation for monitoring address data supplied by the CPU 10. Because it is not necessary to monitor the address data supplied by the CPU 10, it is not necessary for the CPU to maintain the address data of an address as the start transfer-origin address, during the DMA operation for decompressing.

In the second embodiment, the decoder circuit 23 starts reading of compressed data from the ROM 20, decompressing it and DMA transferring it, after the CPU 10 supplies DMA operation start instructions. However, there may be a case which requires that the decoder outputs decoded data immediately after the CPU 10 supplies the DMA operation start instructions. In this case, it is necessary to start reading compressed data from the ROM 20, decompressing it and DMA transferring it, before the CPU 10 supplies DMA operation start instructions. The decoder circuit 23 in a third embodiment of the present invention performs the decoding operation in this manner.

The decoder circuit 23 in the third embodiment will now be described with reference to FIGS. 10, 11 and 12A, 12B, 12C, 12D, 12E and 12F.

Figure 10:
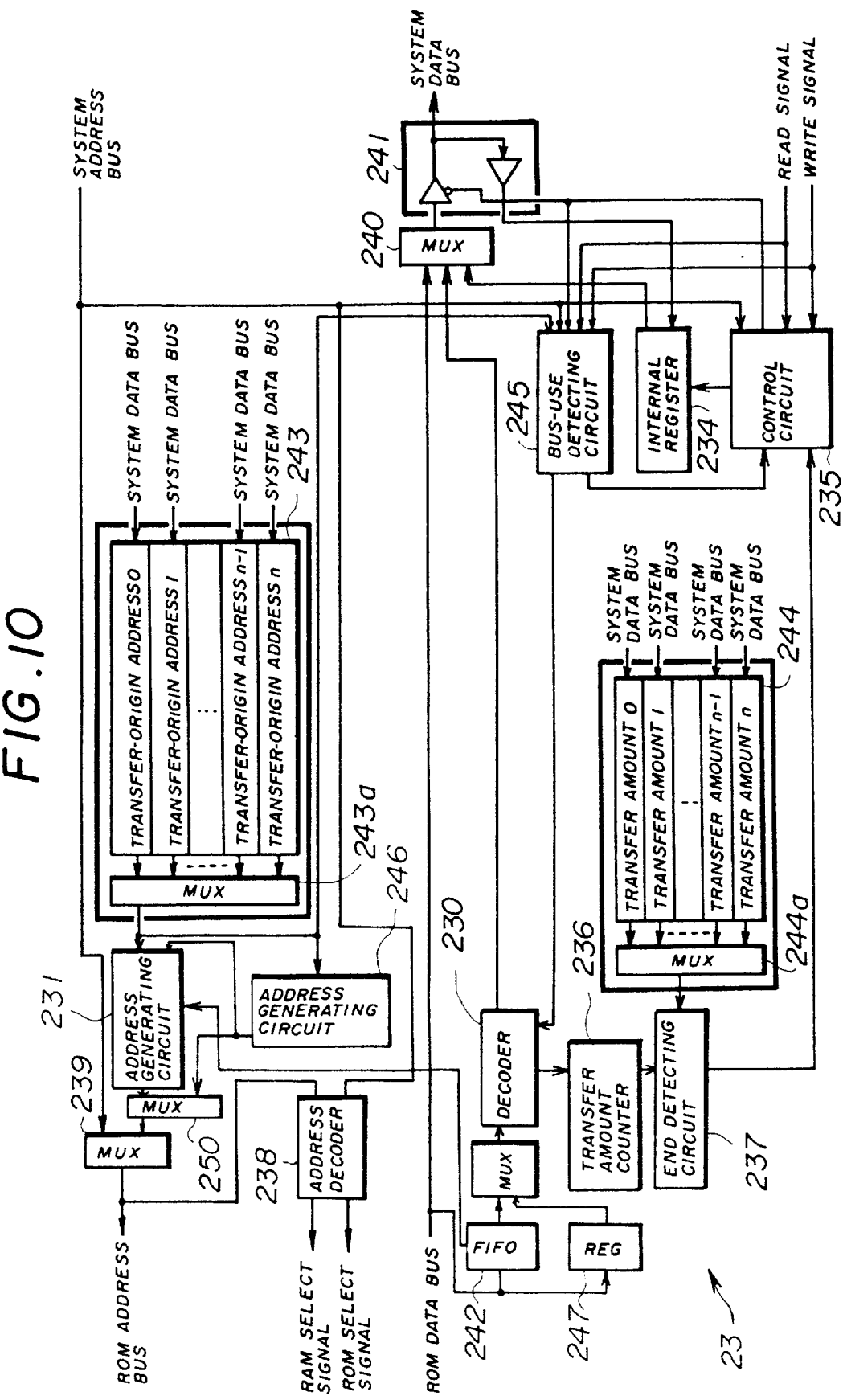
FIG. 10 shows a block diagram of a decoder circuit in the third embodiment of the present invention.

As shown in FIG. 10, in the third embodiment, differently from the arrangement shown in FIG. 6, a second address generating circuit 246, a multiplexer 250 for selecting one of the address data supplied by the two address generating circuits 246 and 231 and supplying the selected one, and a data register 247 for storing data from the ROM 20 are additionally provided.

Figure 11:
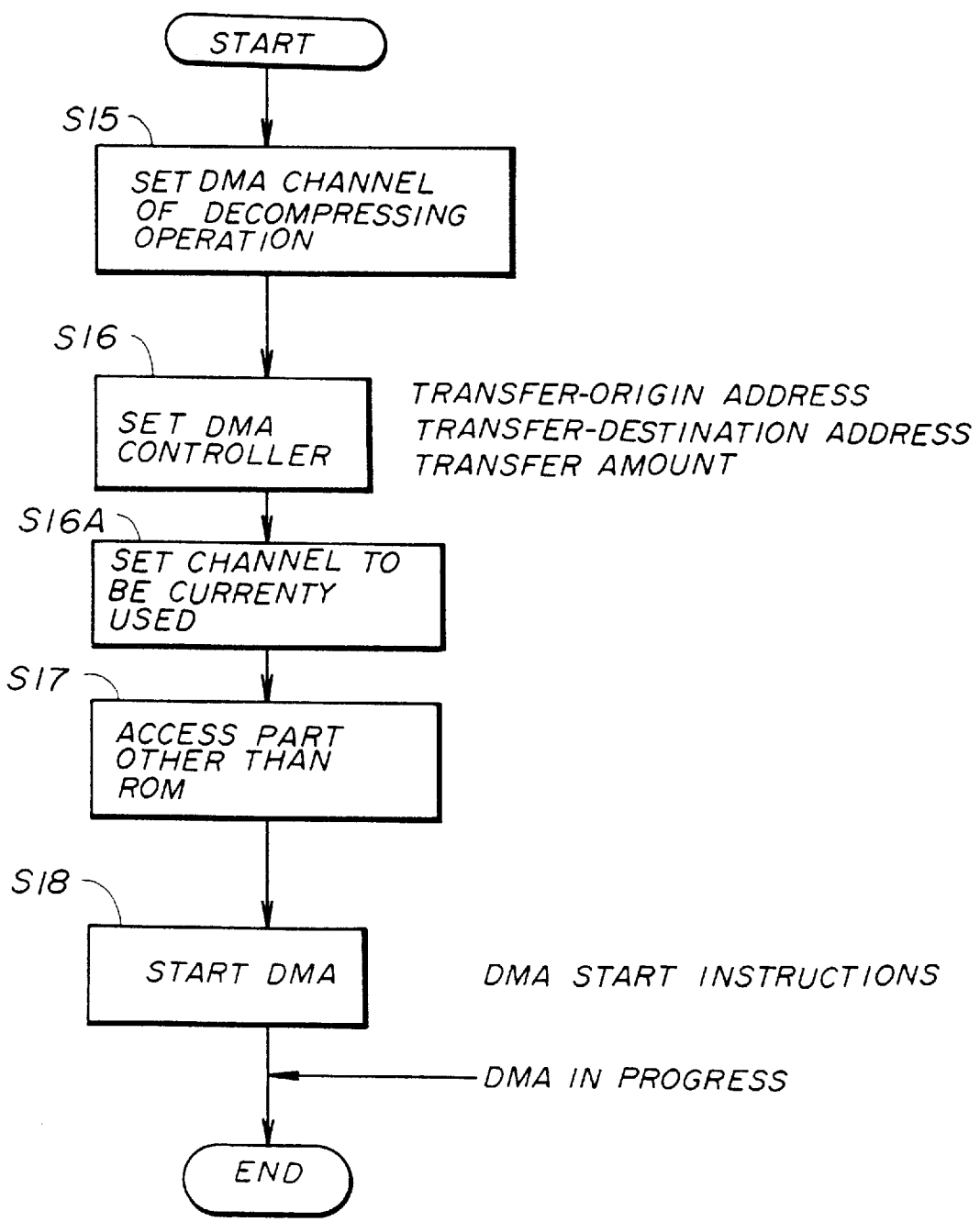
FIG. 11 shows a flowchart of a processing program executing in the decoder circuit in the third embodiment.

An operation of the third embodiment will now be described with reference to FIG. 11.

Similar to the case of the second embodiment, among the predetermined plurality of DMA channels, DMA channels used in DMA operations for decompression are set to the internal register 234 of the decoder circuit 23 in S15. This setting should be done only when initially setting and changing original setting values.

Then, in S16, the CPU 10 sets transfer-origin addresses, transfer-destination addresses and data indicating relevant transfer amounts in the DMAC 11. At this time, transfer-origin address data and transfer amount data the same as those set in the DMAC 11 are written in the transfer-origin address register group 243 and transfer amount register group 244. Similar to the case of the second embodiment, a transfer-origin address is incremented or decremented in an ordinary DMA transfer operation. However, a transfer-origin address in a DMA transfer operation using a DMA channel for performing a decompressing operation is neither incremented nor decremented but fixed. In order to cause such an operation to be performed, the DMAC 11 is appropriately set.

Then, in S16A, the CPU 10 writes DMA channels to be currently used in the internal register of the decoder circuit 23. In S17, the CPU 10 accesses a predetermined part other than the ROM 20. Then, the CPU 10 instructs start of a DMA operation, in S18.

As mentioned above, in S16A, the CPU 10 writes the DMA channels to be currently used in the internal register 234 of the decoder circuit 23 in S16A. The thus-written DMA channels may include ordinary DMA channels not for decompressing operations. The decoder circuit 23 determines whether or not the internal register 234 has DMA channels for decompressing operations written therein. If the internal register 234 has DMA channels for decompressing operations written therein, the decoder circuit 23 starts decompression of relevant compressed data. Specifically, among the DMA channels for decompressing operations, a transfer-origin address of a DMA channel having a highest priority order is supplied by a relevant register in the transfer-origin address register group 243 to the address generating circuit 231 as a start address. Further, a transfer-origin address of a DMA channel having a priority order subsequent to the highest one is then supplied by a relevant register in the transfer-origin address register group 243 to the second address generating circuit 246 as another start address. If there is no DMA channel for decompressing operation in the internal register 234, no decoding operation is started. Further, there is only one DMA channel for decompressing operation, no data is set in the second address generating circuit 246.

Then, the CPU 10 accesses a predetermined part other than a ROM region predetermined times.

To access the ROM region means to access according to addresses which indicate the ROM 20. In the above-described embodiments according to the present invention, when the CPU accesses the ROM region, the CPU does not always directly access the ROM 20 but the CPU accesses a buffer memory contained in the decoder 230 and thus reads decoded data therefrom. The decoder 230 decodes an amount of compressed data and stores thus-decoded data in the buffer memory. As the thus-stored decoded data is read out, the decoder 230 decodes a subsequent amount of compressed data and store it in the buffer memory.

Figure 12:
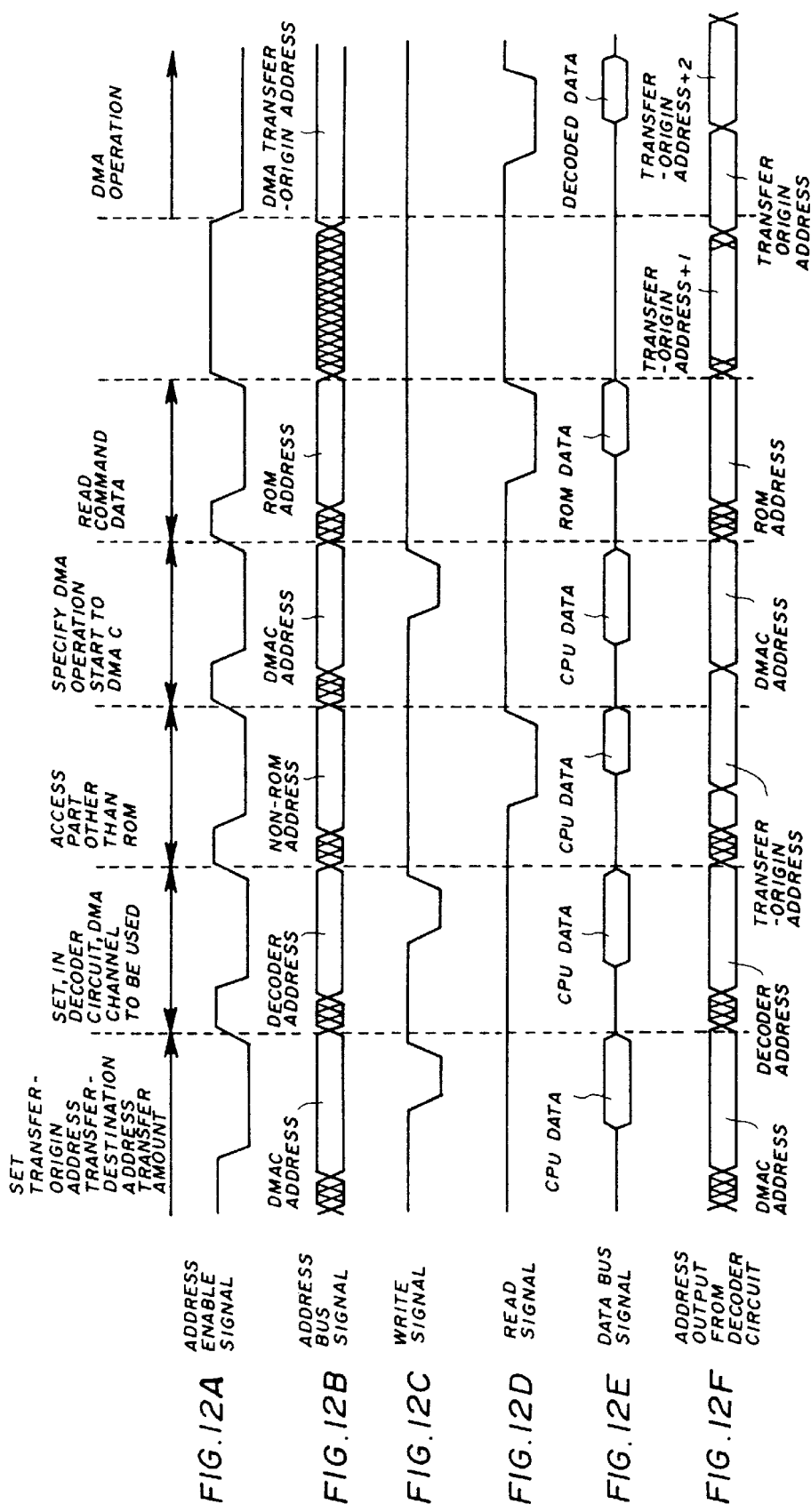
FIGS. 12A, 12B, 12C, 12D, 12E and 12F show time charts of a DMA operation in the decoding circuit in the third embodiment.

In the operation shown in FIGS. 12A–12F, a predetermined part other than the ROM 20, indicated as a non-ROM address in FIG. 12B, is accessed once. The number of times the predetermined part other than ROM 20 is accessed depends on the system. During a time the CPU accesses the predetermined part other than the ROM 20, the decoder circuit 23 uses the start address previously set in the address generating circuit 231, reads the necessary amount of compressed data from the ROM 20, and then starts decoding of the thus-read out compressed data. The decoder circuit 23 performs a decoding operation as long as possible. When the decoder circuit 23 has completed decoding of the thus-read amount of compressed data, the decoding operation is halted until a subsequent amount of compressed data is read out from the ROM 20.

When the decoder circuit 23 has detected DMA operation start instructions supplied by the CPU 10, during a time starting from the detection of the DMA operation start instructions supply and ending at an actual DMA operation start, the decoder circuit 23 may use the start address previously set in the address generating circuit 231, read compressed data from the ROM 20, and then writes the thus-read data to the FIFO memory 242. Whether or not such data reading should be performed during this time depends on a data decoding system being used. In a case where the time required for actually starting the DMA operation, after providing the DMA operation start instructions is short, such a compressed-data reading operation may not be performed. In such a case, it is necessary to previously read a predetermined amount of compressed data from the ROM 20.

The decoder 230 reads the compressed data from the FIFO memory 242 and start decoding the compressed data. Then, an address output to the ROM 20 is returned, from an output from the internal address generating circuit 231 to an output from the external system address bus. When a reading cycle of a DMA operation is started, it is determined whether or not address data supplied from the CPU 10 is a previously set transfer-origin address relevant to a DMA channel for decompressing. If the address supplied from the CPU 10 is the previously set transfer-origin address, the data switching circuit 241 selects data from the decoder 230 and outputs the thus-decoded data. Simultaneously, an address output to the ROM 20 is changed to an output from the address generating circuit 231. Then, a subsequent amount of compressed data is read out from the ROM 20 and the above-described operation is repeated.

If the FIFO memory 242 becomes full during the above-described operation, the decoder circuit 23 uses the second address generating circuit 246 when accessing the ROM 20. Thus, the decoder circuit 23 reads compressed data from the ROM 20, and writes the thus-read data to the data register 247. After the data register 247 has become full, data writing to the data register 247 is terminated. The data thus written to the data register 247 is needed for preparing the previously decoded data before a DMA operation for decompressing is actually started.

After completing decoding of a previously set transfer amount of data, the decoder circuit 23 initializes the FIFO memory 242, and sets a current address of the second address generating circuit 246 to the first address generating circuit 231. An output from the transfer amount register group 244 is output from a register relevant to a DMA channel for decompressing, among the previously set DMA channels, which has the highest priority order. When compressed data is subsequent read from the ROM 20, the first address generating circuit 231 supplies an address and the thus-read data is written in the FIFO memory 242.

When the decoder circuit 23 has completed decoding the previously set transfer amount of data, a DMA operation through a current DMA channel is in progress. In a case where a time difference between a DMA operation accompanied by a current decompressing operation and another DMA operation accompanied by a subsequent decompressing operation is short, it is necessary to read compressed data and decode it before the DMA operation accompanied by the subsequent decompressing operation is started.

For this purpose, the decoder circuit 23 reads compressed data which was previously read out from the ROM 20 and then written in the data register 247 and decodes it. When the data written in the data register 247 has been completely decoded, the decoder 230 reads compressed data from the FIFO memory 242 and decodes it.

If the FIFO memory 242 becomes full in a case where the presently performing DMA operation is the last one and there is no other DMA operation to be performed subsequently, reading of compressed data from the ROM 20 which is performed simultaneously with decoded data being read out from the decoder 230 in the DMA operation, is not performed. Thus, when all operations using the DMA channels for decompressing have been completed, the decoder circuit 23 terminates the decoding operation.

In this third embodiment, operation of the decoder circuit 23 is started before a DMA operation accompanied by a decompressing operation is started. By creating a time as a result of the CPU 10 accessing a predetermined part other then the ROM 20, compressed data can be previously read out from the ROM 20 during the thus-created time. Thus it is possible to previously prepare data to be decoded before DMA is started. Further, the second address generating circuit 246 and data register 247 for previously reading the compressed data from the ROM 20 are provided inside the decoder circuit 23. Thereby, when the FIFO memory 242 becomes full during a decoding operation being performed using a DMA channel, the address generating circuit 246 and register 247 may be used and thus compressed data read out from the ROM 20 for a subsequent DMA operation may be written in the register 247. Then, when a current DMA operation has been finished, a decoding operation for a subsequent DMA operation is performed using the data thus stored in the register 247. As a result, it is possible to shorten a time span between sequential DMA operations using DMA channels, thus, the decoder circuit 23 can perform sequential DMA operations without requiring an extra preparation time for decoding.

Figure 13:
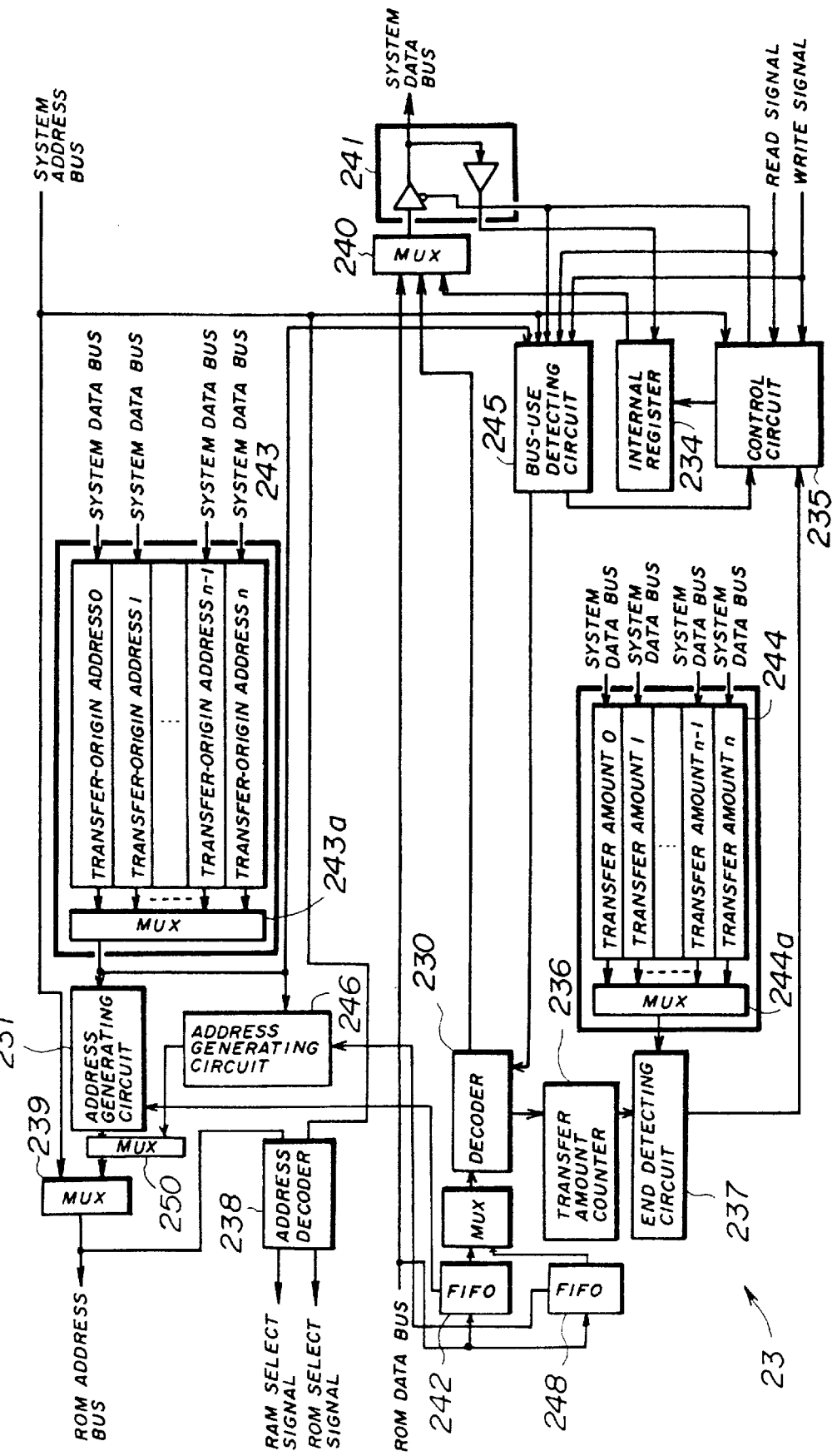
FIG. 13 shows a block diagram of a decoder circuit in the fourth embodiment of the present invention.

With reference to FIG. 13, the decoder circuit in a fourth embodiment of the present invention will now be described.

As shown in FIG. 13, in the fourth embodiment, instead of the data register 247 provided in the third embodiment, a second FIFO memory 248 is provided. In this embodiment, when a DMA operation accompanied by a first decompressing operation is performed, a starting address of a DMA operation accompanied by a decompressing operation of a priority subsequent to the highest one is set in the second address generating circuit 246.

When the first FIFO memory 242 becomes full during the DMA operation accompanied by the first decompressing operation being performed, the second address generating circuit 246 as well as the second FIFO memory 248 is used for previously storing compressed data read out from the ROM 20 for a subsequent DMA operation. When the current DMA operation is completed and the subsequent DMA operation is started, the second address generating circuit 246 is continuously used and thus compressed data read out from the ROM 20 is written in the second FIFO memory 248. When the second FIFO memory 248 as well as the second address generating circuit 246 is thus continuously used for the subsequent DMA operation, the first FIFO memory 242 is cleared and the functions of the first and second address generating circuits 231 and 246 are switched therebetween as the functions of the first and second FIFO memories 242 and 248 are switched therebetween.

In this case, a starting address of the DMA operation accompanied by the priority subsequent to the highest priority is set in the first address generating circuit 246. The decoder 230 reads the compressed data from the second FIFO memory 248 and starts decoding it.

If a subsequent DMA operation is one not accompanied by a decompressing operation, no decoded data will be supplied from the decoder circuit 230 and, therefore, the decoding operation is halted until a DMA operation accompanied by a subsequent decompressing operation is started.

When the DMA operation accompanied by the subsequent decompressing operation is started, the decoding operation is restarted. Simultaneously the second address generating circuit 246 is used for generating addresses, compressed data is read and then is written in the second FIFO memory 248. If the second FIFO memory 248 is full when compressed data is written therein, the first address generating circuit 231 is then used and thus compressed data read out from the ROM 20 for a subsequent DMA operation is stored in the first FIFO memory 242 for a subsequent decoding operation.

Then, when the DMA operation accompanied with the current decompressing operation has been completed, the functions of the first and second address generating circuits 231 and 246 are switched therebetween as the functions of the first and second FIFO memories 242 and 248 are switched therebetween.

If, at this time, a DMA operation accompanied by a subsequent decompressing operation is the DMA operation accompanied by the last decompressing operation, the second address generating circuit 246 and second FIFO memory 248 are not used.

Thus, in the fourth embodiment, the first address generating circuit 231 and first FIFO memory 242, and the second address generating circuit 246 and second FIFO memory 248 are alternately used. As a result, it is possible to easily control data reading and storing operations.

In fact, in the case where the register is used together with the single FIFO memory, in comparison to the case of using the two FIFO memories, when the DMA operation with the first decompressing operation has been finished, an address currently being supplied by the second address generating circuit is one which has been advanced from a starting address of a DMA operation with a subsequent decompressing operation. The thus-advanced address should be set in the first address generating circuit. Then, a decoding operation should be performed in a manner in which data stored in the register is first decoded, and after it is decoded, data stored in the FIFO memory is decoded. Thus, a complicate control operation is required for the decoding operation.

However, in contrast to this, in the case where the two FIFO memories are used as in the fourth embodiment, merely switching between the two address generating circuits and two FIFO memories is required for the same purpose. Accordingly, the control method can be simplified.

Each of the above-described embodiments is an embodiment for DMA operations. However, the present invention is also applicable to an embodiment which uses an ordinary memory accessing method in which the CPU 10 performs an accessing operation in an ordinary manner by executing a software program. A fifth embodiment, which will now be described with reference to FIG. 14, is the embodiment using such an ordinary accessing method.

Figure 14:
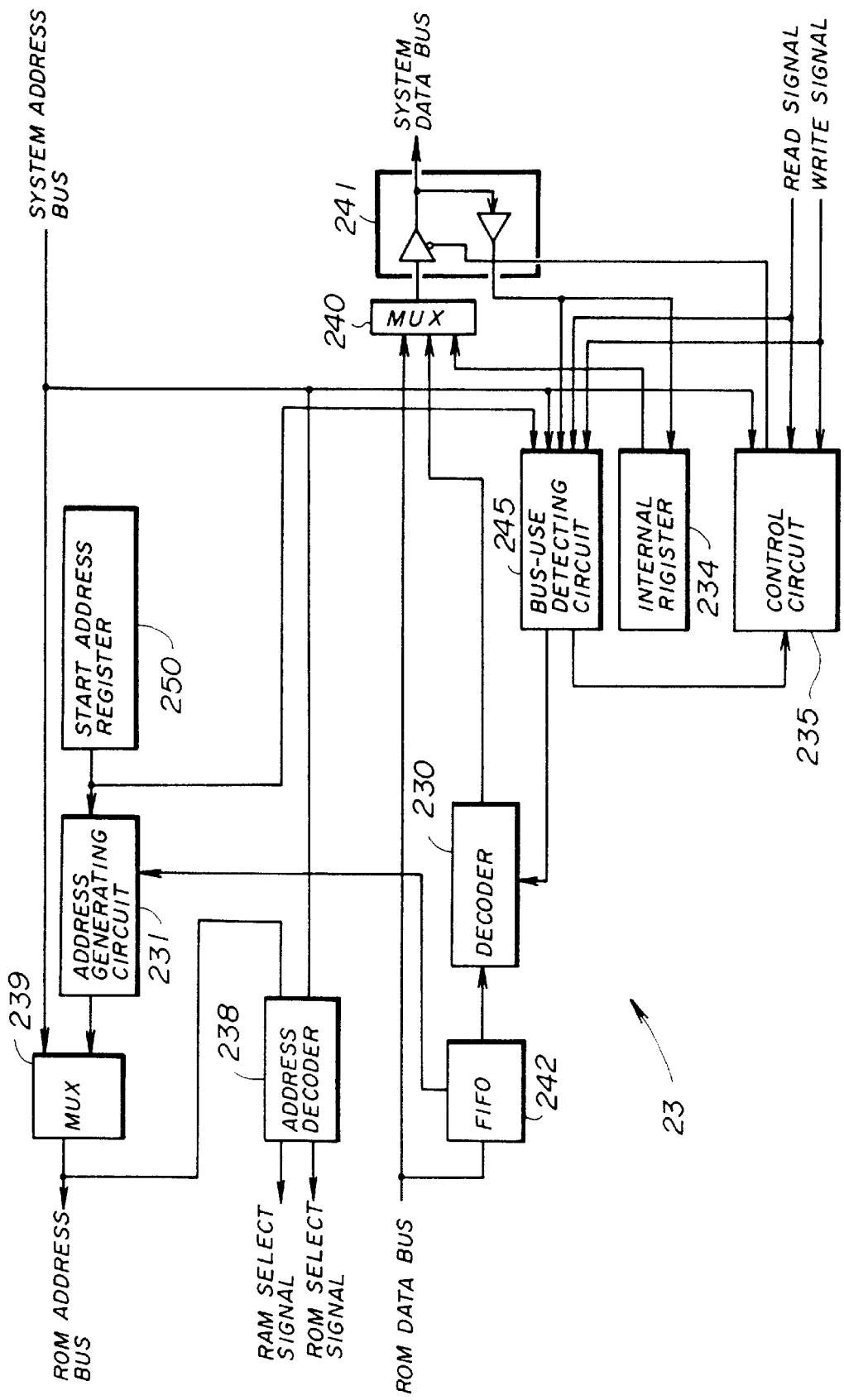
FIG. 14 shows a block diagram of a decoder circuit in the fifth embodiment of the present invention.

As shown in FIG. 14, in the fifth embodiment, a start address register 250 is provided in which a start address of compressed data to be decompressed is set. The CPU 10 writes in the start address register 250 a start address used in a transfer operation. The start address register 250 then supplies the start address to the address generating circuit 231. When the CPU 10 accesses the ROM 20, reads compressed data therefrom, cause the data to be decoded, and then to be transferred. A data transfer amount can be controlled by the CPU 10 through software. As a result, no means for detecting end of decoding is provided. However, it is also possible, similar to the other embodiments, to monitor a current transfer amount and automatically terminate a decoding operation through a predetermined circuit.

Figure 15:
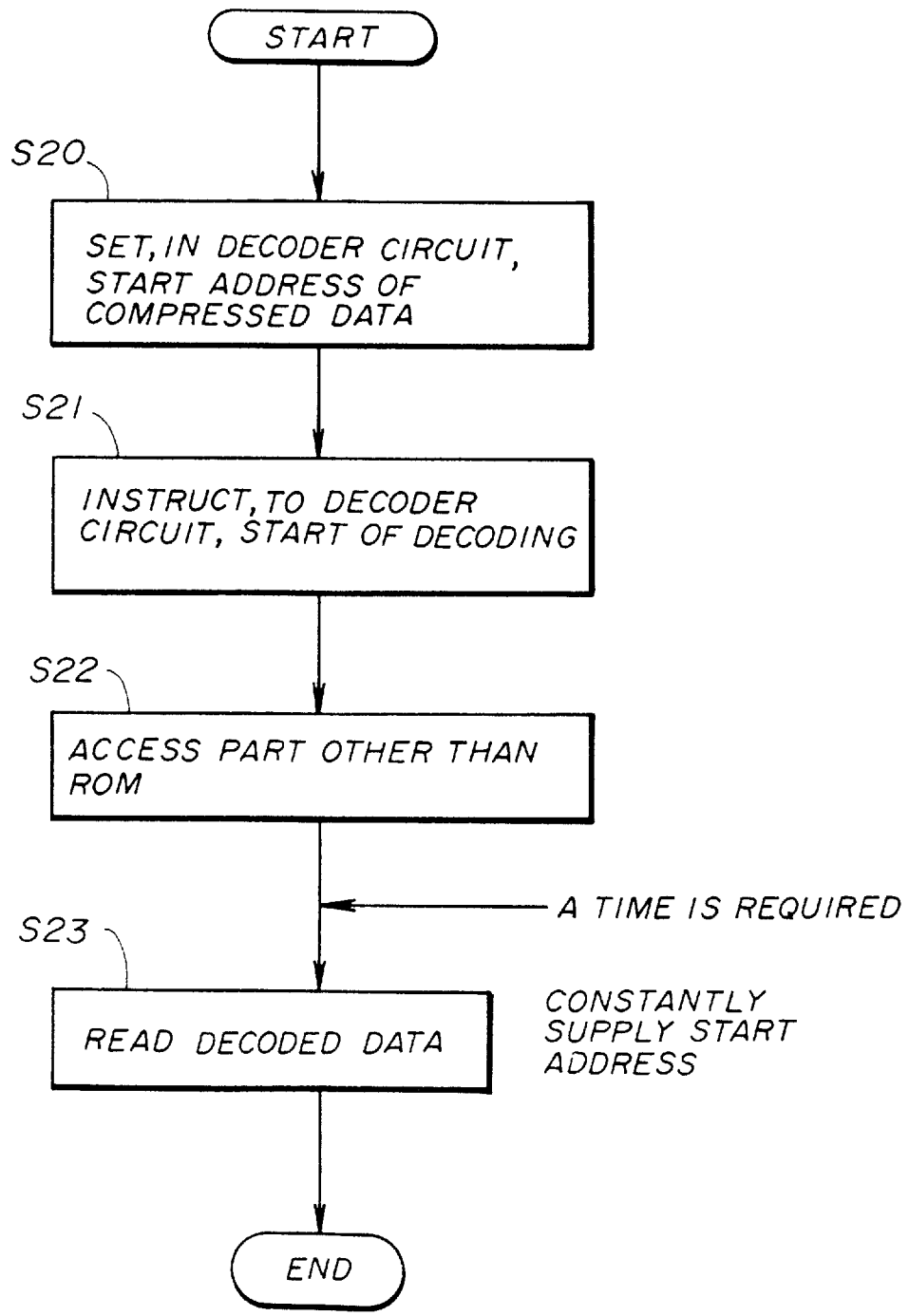
FIG. 15 shows a flowchart of a processing program executing in the decoder circuit in the fifth embodiment.

With reference to FIG. 15, a data reading, decoding and transferring operations performed by the decoder circuit 23 in the fifth embodiment under control of the CPU 10 will now be described. When the CPU 10 attempts to cause compressed data to be decoded and finally transferred to the CPU 10, the CPU 10 writes a start address of the compressed data to a start address register 250 in the decoder circuit 23 in S20. Then, the CPU 10 instructs start of decoding to the decoder circuit 23 in S21.

As a result, the decoder circuit 23 starts decoding and thus first sets the start address, stored in the start address register 250, to the address generating circuit 231. The decoder circuit 23 monitors the system address bus and determines whether the CPU 10 accesses any part other than the ROM 20. In S22, the CPU 10 accesses the predetermined part other than the ROM 20.

When determining if the CPU 10 accesses the predetermined part other than the ROM region, the decoder circuit 23 uses the start address supplied by the address generating circuit 231 and reads compressed data from the ROM 20. The thus-read compressed data is then written in the FIFO memory 242. The decoder 230 reads the compressed data from the FIFO memory 242, decodes it and outputs the decoded data to the system data bus in S23. After a predetermined time has elapsed, the CPU 10 starts reading the decoded data from the system data bus. This predetermined time is a time required for the decoder 230 to decode the compressed data and thus be able to supply the decoded data to the system data bus. Before the CPU 11 starts reading the decoded data from the buffer memory contained in the decoder 230 by accessing the buffer memory, it is not necessary that the CPU 10 performs an operation concerning the data decoding and transfer.

Addresses used for reading out compressed data from the ROM 20 are those starting only from the previously set start address. After a decoding operation is started, the decoder circuit 23 always monitors the system address bus and determines whether the start address stored in start address register 250 is present. Only when the start address stored in the start address register 250 is present in the system address bus, the decoder circuit 23 supplies decoded data. Therefore, if the CPU 10 attempts to access the ROM 20 even during a decoding operation, the CPU 10 may supply to the system address bus an address other than the start address stored in the start address register 250. As a result, the decoder circuit 23 stops supplying decoded data to the system data bus and thus the system data bus can be used for transfer data directly read out from the ROM 20.

When the CPU 10 has finished reading of a predetermined amount of decoded data from the system data bus, the CPU 10 causes the decoder circuit 23 to stop decoding. However, when using this decoder circuit 23, the CPU 10 can directly access the ROM 20 during a decoding operation as mentioned above. Accordingly, it is also possible that when it is demanded to stop a current decoding operation and then start a subsequent decoding operation, a new start address may be set in the start address register 250. As a result, the current decoding operation is automatically stopped and then the subsequent decoding operation is automatically started using the thus-set new start address. Thus, no special operation for stopping the current decoding operation is needed to be performed.

In some of the above-described embodiments, compressed data is read out from the ROM 20 either prior to detection of DMA operation start instructions or prior to accessing the buffer memory in the decoder 230 by the CPU 10 for reading decoded data therefrom. After a decoding operation has been performed during a predetermined time, either a DMA operation or operations of accessing the buffer memory in the decoder 230 and reading data from the buffer memory by the CPU 10 is performed, and decoded data is supplied. However, there may be a case where it is not possible to provide the time required for previously reading compressed data from the ROM 20 and decoding it. In such a case, the decoder circuit 23 in a sixth embodiment which will now be described with reference to FIG. 16 is useful.

Figure 16:
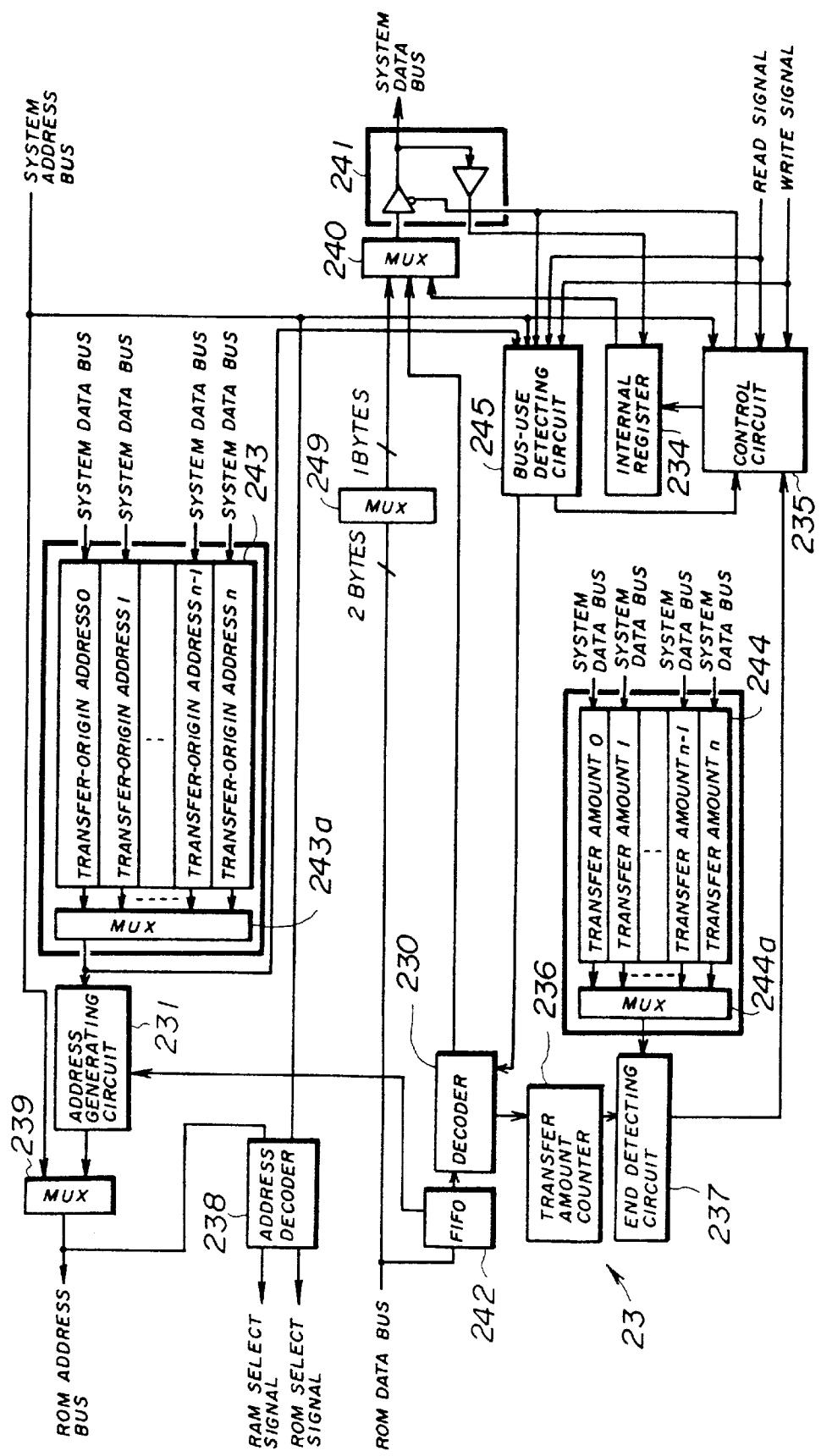
FIG. 16 shows a block diagram of a decoder circuit in the sixth embodiment of the present invention.

As shown in FIG. 16, in the sixth embodiment, a data switching circuit 249 is provided in addition to the arrangement of the second embodiment shown in FIG. 6. The data switching circuit 249 selects one byte of data between two bytes of data supplied from the ROM 20 via a ROM data bus.

In the sixth embodiment, initial setting is the only setting of DMAC 11. Data stored in the ROM 20 has a structure such as that shown in FIG. 18. Specifically, first and third bytes of data is non-compressed data, and a second, fourth and all the other bytes of data are compressed data. A necessary condition of this embodiment is that an amount of data which the decoder circuit 23 reads in each DMA access cycle is larger than an amount of data which is read out from the decoder circuit 23 in each DMA cycle. For example, in a DMA operation, one byte of data is transferred from the decoder circuit 23 in each cycle, the decoder circuit 23 can read 1.5 through 2 bytes of data from the ROM 20 in each cycle. In this embodiment, a bus width of the ROM data bus of the ROM 20 is two bytes and a bus width of the system data bus is one byte.

When the CPU 10 sets, in the DMAC 11, transfer-origin addresses, transfer-destination addresses and transfer amounts, the same transfer-origin addresses and transfer amounts are set in the transfer-origin address register group 234 and transfer amount register group 244, respectively, for respective DMA channels. Then, the CPU 10 instructs DMA operation start to the DMAC 11 and causes the DMA operation to be started.

Figure 17:
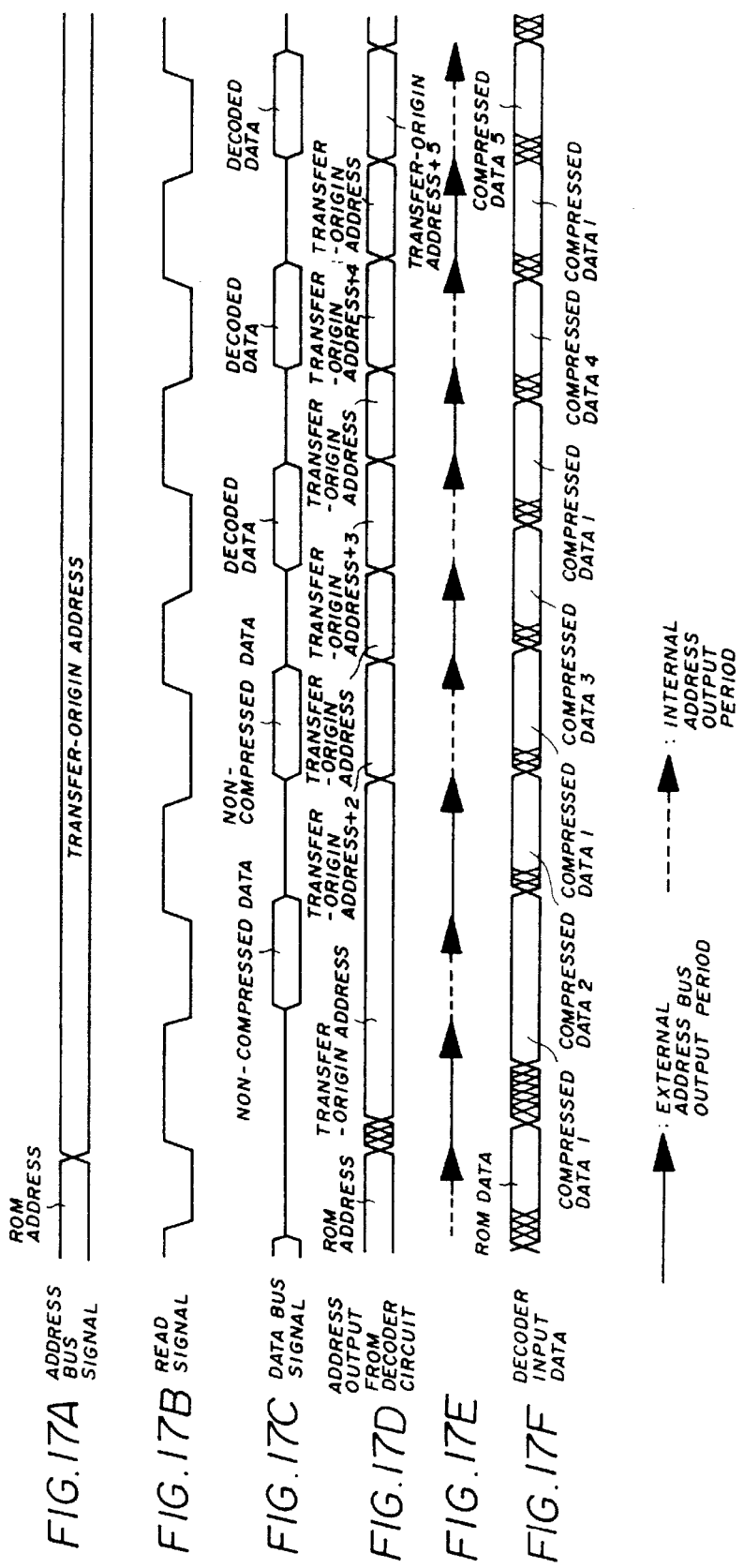
FIGS. 17A, 17B, 17C, 17D, 17E and 17F show time charts of a DMA operation in the decoding circuit in sixth embodiment.
Figure 18:
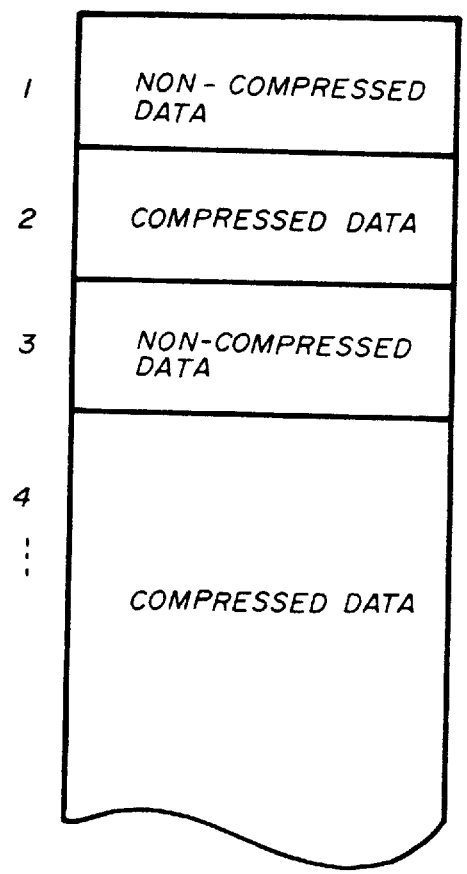
FIG. 18 shows a structure of a ROM used in the sixth embodiment.

The decoder circuit 23 detects the start of the DMA operation as a result of monitoring the system address bus. The decoder circuit 23 then sets a predetermined one of the previously set transfer-origin addresses to the address generating circuit 231 and reads two bytes of data (indicated as compressed data 1 in FIG. 17F), among bytes of data having a structure such as that shown in FIG. 18, from the ROM 20. These two bytes of data are a byte of non-compressed data and a byte of compressed data as shown in FIG. 18. The second byte of data of the thus-read two bytes of data is written in the FIFO memory 242. This second byte of data is compressed data as shown in FIG. 18. The decoder 230 reads the byte of compressed data from the FIFO memory 242 and decodes it. The first byte of data, that is, the byte of non-compressed data is supplied to the system data bus via the data switching circuit 249.

In a subsequent DMA cycle, third and fourth bytes of data shown in FIG. 18 are read out from the ROM 20. The third byte of data, that is, the byte of non-compressed data is supplied to the system data bus as a second byte of data via the data switching circuit 249. In the FIFO memory 242, fourth and fifth bytes of compressed data are written. At this time, the decoder circuit 23 has prepared decoded data to be supplied in a subsequent DMA cycle. Therefore, in each of DMA cycles starting from the third DMA cycle, the decoder 230 supplies decoded data as shown in FIG. 17C.

Thus, in this sixth embodiment, a decoding operation may be started when data provided to the system data bus is started. As a result, control of the decoder circuit 23 is very simple. In fact, in an above-described case, the decoder circuit reads compressed data before decoded data in the buffer memory of the decoder 230 is read out. Thus, it is necessary that the CPU access the predetermined part other than the ROM region. In the sixth embodiment, such an extra operation is not necessary to be performed. Further, it is not necessary to read compressed data before the CPU accesses the ROM region for reading decoded data. Accordingly, it is not necessary to write, in the register of the decoder circuit, a DMA channel to be currently used, before performing a DMA operation.

However, an amount of original data represented by compressed data depends on a system currently being used, and the data structure of compressed data shown in FIG. 18 is merely one example. Variations of an operation sequence shown in FIGS. 17A–17F may be considered appropriate to a data structure of compressed data. Further, the concept of the sixth embodiment can also be applied to a decoding system using a data transfer method in which the CPU 10 accesses the buffer memory of the decoder 230 instead of the DMA method.

Figure 19:
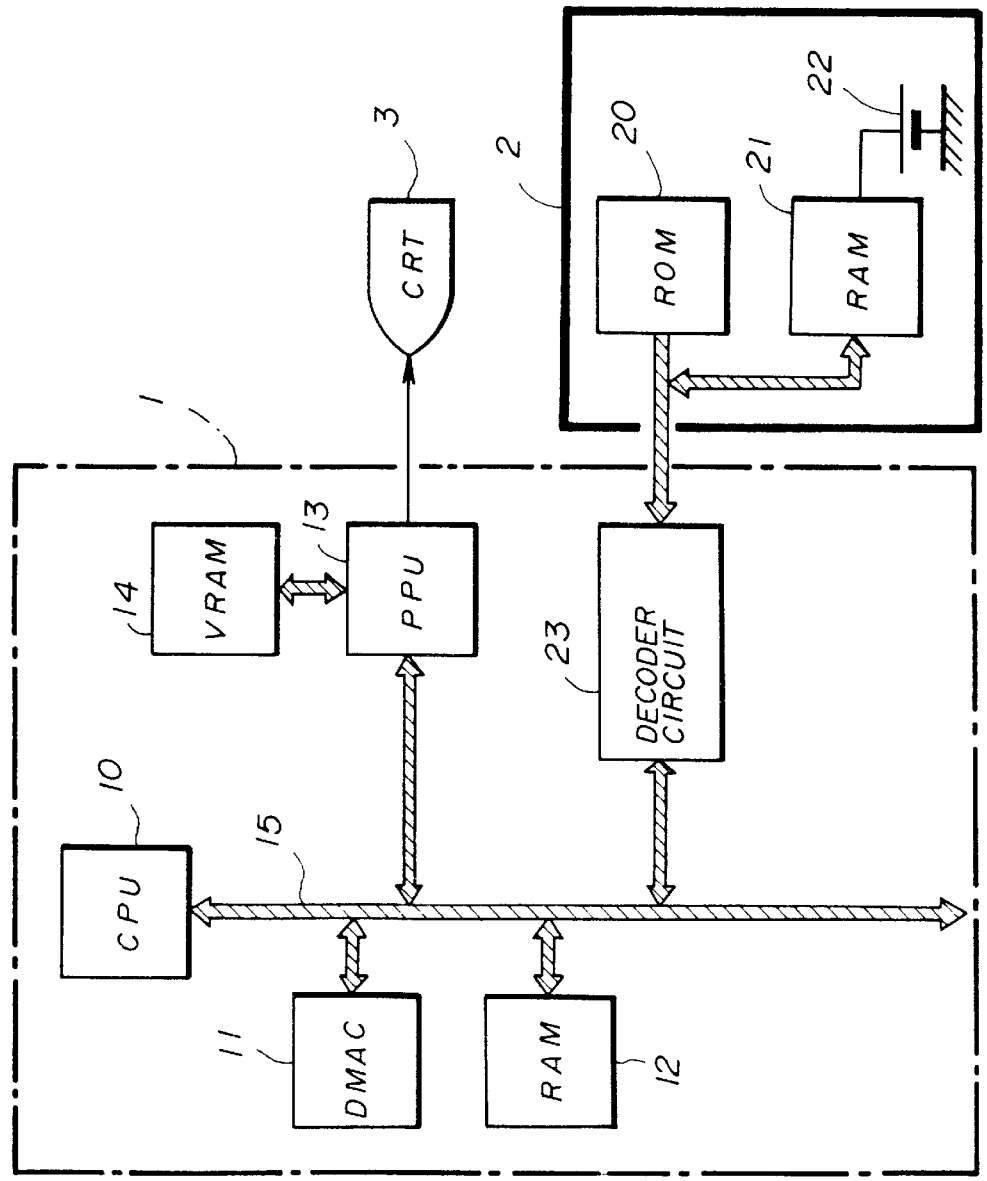
FIG. 19 shows a general block diagram of another example of the game machine using the microcomputer in each of the first, second, third, forth, fifth and sixth embodiments of the present invention.

In each of the above-described embodiments, the decoder circuit 23 is contained in the program cartridge 2 as shown in FIG. 2. However, it is also possible to have the decoder circuit 23 in the game machine body 1 as shown in FIG. 19. In the embodiment shown in FIG. 19, the program cartridge 2, the same as that in the related art shown in FIG. 1, contains the ROM 20 and RAM 21 having the backup battery 22 therefor. The DMAC 11 causes program data and compressed data to be transferred from the ROM 20 to the decoder circuit 23. The decoder circuit 23 may have an arrangement the same as each of those in the above-described embodiments. The decoder circuit 23 operates both in the through mode and decoding mode. In the through mode, input data is output in a format the same as that of the input data. Specifically, in the through mode, the decoder circuit 23 accesses the ROM 20, reads data therefrom and supplies the data to the system bus 15 in a format the same as that of the thus-read data. In the decoding mode, input compressed data is decoded and then output in real time. Specifically, in the decoding mode, the decoder circuit 23 accesses the ROM 20, reads compressed data therefrom, decodes it and supplies decoded data to the system bus 15. The change between the through mode and decoding mode is performed as a result of the CPU 10 accessing the ROM region, specifically, supplying particular data to the system bus 10 as described above.

Thus, when the game machine body 1 contains the decode circuit 23 according to the present invention, the program cartridge 2 has the arrangement same as that of the related art. Accordingly, it is possible to maintain low costs of the program cartridge 2.

As described above, according to the present invention, when data obtained as a result of decoding compressed data is successively transferred, the CPU 10 merely operates as if directly accessing the ROM 20, because an operation for decoding the compressed data is performed by the decoder circuit individually. Thus, the CPU can completely disregard the time required for transferring compressed data to a work RAM and the time required for decoding the compressed data. Thus, image display can be smoothly performed without delay.

Therefore, even in a case where considerable time is required for decoding compressed data, this time can be disregarded because the operation is performed by the decoder circuit individually. Accordingly, even in such a case, the program cartridge 2 can have the compressed data in the ROM 20 having a reduced storage capacity.

Further, if a data transfer amount is not previously set, after a predetermined amount of data has been decoded and then transferred, it is necessary to have the decoder circuit 23 terminate a current decoding operation and thus enter the through mode. However, according to the present invention, by previously setting a necessary data transfer amount, completion of decoding and transfer of the necessary amount of data is automatically detected by the decoder circuit 23 and the decoder circuit 23 automatically enters the through mode.

Further, according to the present invention, the decoder circuit 23 has the internal RAM 232 and addresses for the RAM 232 are located in a position for the ROM 20 in the address map. Accordingly, during the decoding mode, the CPU 10 can read the processing program from the RAM 232 through an operation the same as that through which the CPU 10 reads the processing program from the ROM 20. Therefore, it is not necessary to use the work RAM 12 to execute the processing program. Thus, an operation program can be simply maintained.

Further, in the related art, after the decoder circuit has entered the decoding mode, it is not possible to directly access the ROM 20 and thus it is not possible to execute a DMA setting software program stored in the ROM 20. Accordingly, it may be necessary to use a memory other than the ROM 20, connected to the decoder circuit, for executing the DMA setting software program stored in the other memory. However, in the first embodiment of the present invention, the DMA setting program is copied to the internal RAM within the decoder circuit and an address region indicating the internal RAM is mapped as a part of the ROM region. As a result, the DMA setting program can be executed there. Accordingly, it is not necessary to execute the DMA setting program stored in a memory which is not connected to the decoder circuit in the system. Further, in other embodiments of the present invention, it is also not necessary to execute the DMA setting program stored in a memory which is not connected to the decoder circuit in the system. Therefore, merely by performing DMA setting and specifying a decoding operation, DMA transfer of decoded data can be easily performed.

Further, even during a decoding operation, when an address different from a specified one is given, the decoder circuit 23 enters the through mode. By such an operation, the CPU 10 can obtain data other than decoded data. Accordingly, if another higher priority order DMA is requested during a DMA operation for decompression, it is possible to perform DMA operations, including DMA operations for decompression and other ordinary DMA operations in a mixed manner, successively. As a result, it is easy to use the decoder circuit 23.

As mentioned above, after the decoder circuit has entered the decoding mode, it is not possible to directly access the ROM 20 and thus it is not possible to execute a memory accessing setting software program stored in the ROM 20. Accordingly, it may be necessary to use a memory other than the ROM 20, connected to the decoder circuit, for executing the memory transfer setting software program stored in this other memory. However, in each of the fifth and sixth embodiments of the present invention, it is possible to retrieve commands from the ROM 20 connected to the decoder circuit even after the decoder circuit has entered the decoding mode. Thus, the memory accessing setting program stored in the ROM 20 can be performed. This is because change between the decoding mode and through mode can be automatically performed in the decoder circuit 23 as a result of monitoring address data flowing through the system address bus. As a result, the CPU 10 may control the change between the through and decoding modes and can execute the memory accessing setting program stored in the ROM 20 as a result of maintaining the through mode for a necessary time and thus the CPU 10 is able to access ROM 20. Thus, even during a decoding operation, a ROM accessing operation performed by the CPU 10 is not limited. (However, as mentioned above, it is necessary to obtain a relevant address at every decoded data transferring cycle.) Thus, real-time data decoding using hardware such as the decoder circuit can be easily achieved.

Further, if a system currently being used is a system in which there can be no preparation time for previously reading and compressed data from the ROM 20 and then decoding it before output of decoded data is instructed, a decoding operation can be easily performed in an arrangement such as that in the sixth embodiment shown in FIG. 16.

Further, the present invention is not limited to the above-described embodiments, and variations and modifications may be made without departing from the scope of the present invention.

What is claimed is:

1. A data decoder circuit, comprising:
    an address generating circuit generating addresses as a result of one of incrementing and decrementing a given address;
    a decoder reading compressed data from a recording medium according to the addresses generated by said address generating circuit, said decoder decoding said compressed data to provide decompressed data and output said decompressed data;
    an address switching circuit which selects one of an address supplied by said address generating circuit and an address supplied from an external address bus, and outputs said selected address;
    a data switching circuit which selects one of data supplied from said recording medium and data supplied by said decoder, and outputs said selected data to a data bus; and, wherein;
    said decoder circuit enters one of a through mode and a decoding mode, input data being output in input form in said through mode, input compressed data being decoded and output in said decoding mode; and
    when an address for said recording medium is provided externally, said decoder circuit enters said through mode and data read out from said recording medium is output to said data bus, and when an address for said recording medium is given from said address generating circuit, said decoder circuit enters said decoding mode, reads compressed data from said recording medium, decodes said compressed data and outputs said decoded data to said data bus.

2. A data decoder circuit according to claim 1, wherein, an amount of data to be supplied from said decoder circuit is previously set and said decoder circuit enters said through mode when said decoder circuit has supplied said amount of data.

3. A data decoding circuit according to claim 1, further comprising:
    an internal memory; and
    an address mapping circuit arbitrarily setting an address map including addresses for said internal memory; and
    wherein said data switching circuit selects data from one of said internal memory, said recording medium and said decoder.

4. The data decoder circuit, according to claim 1, wherein:
    a start address of the compressed data being previously set in said decoder circuit;
    said decoder circuit outputs the decoded data and reads the compressed data from said recording medium only when an address the same as said start address is given; and
    said decoder circuit enters said through mode when an address the same as said start address is not given.

5. The data decoder circuit according to claim 1, wherein:
    said recording medium stores both compressed data and non-compressed data;
    a start address of said compressed data and non-compressed data being previously set; and,
    when the previously set address is given, said decoder circuit starts reading said compressed data and non-compressed data and decodes said compressed data; in one of a first reading cycle and a first plurality of reading cycles, said decoder circuit outputs said non-compressed data, and subsequently outputs data obtained as a result of said decoding of said compressed data.

6. A data decoder circuit, comprising:
    an address generating circuit generating addresses as a result of one of incrementing and decrementing a given address;
    a decoder reading compressed data from a recording medium according to the addresses supplied by said address generating circuit, said decoder decoding said compressed data to provide decompressed data and output said decompressed data;
    an address switching circuit which selects one of an address supplied by said address generating circuit and an address supplied from an external address bus, and outputs said selected address;
    a data switching circuit which selects one of data supplied from said recording medium and data supplied by said decoder, and outputs said selected data to a data bus; and a detecting circuit detecting what address flows through said address bus;

and, wherein;

said decoder circuit being set to perform a decompressing operation when a DMA operation is performed;

said detecting circuit detects an address for said DMA operation, the address supplied by said address generating circuit used as an address according to which data is read out from said recording medium, said decompressed data being output to said data bus;

in the absence of said detecting circuit detecting an address for said DMA operation, the address supplied via said address bus being used as an address according to which data is read out from said recording medium, said read out data being output to said data bus as read out from said recording medium.

7. The data decoder circuit according to claim 6, wherein;

in response to instructions to enter said decoding mode, when detecting a given address for a part other than said recording medium, said decoder circuit reads compressed data from said recording medium and starts decompressing said compressed data to provide decoded data; and when detecting a DMA operation start instructions, said decoder circuit outputs said decoded data.

8. A data decoder circuit, comprising:

an address generating circuit generating addresses as a result of one of incrementing and decrementing a given address;

a decoder reading compressed data from a recording medium according to the addresses provided by said address generating circuit, said decoder decoding said compressed data to provide decompressed data as decoded data and outputting said decompressed data;

an address switching circuit which selects one of an address supplied by said address generating circuit and an address supplied from an external address bus, and outputs said selected address;

a data switching circuit which selects one of data supplied from said recording medium and data supplied by said decoder, and outputs said selected data to a data bus; and a detecting circuit detecting said selected address in said address bus;

and, wherein;

said decoder circuit operating in one of two modes, a through mode and a decoding mode, input data being output in input form in said through mode, input compressed data being decoded and said decoded data being output in said decoding mode; and in response to instructions to operate in said decoding mode, upon detecting a given address for a predetermined part other than said recording medium, said decoder circuit reads compressed data from said recording medium and decompresses said compressed data;

upon agreement of a given address with a previously set address, said decoder circuit outputs said decoded data; and upon disagreement of a given address with said previously set address, said decoder circuit operates in said through mode.

9. A data decoder circuit, comprising:

a first plurality of registers in which addresses for reading compressed data are set;

a control register for controlling start of plurality of decoding operations having previously set priority orders, said plurality of decoding operations corresponding to respective ones of said plurality of registers;

a second plurality of resisters in which predetermined amounts of data to be transferred are set corresponding to respective ones of said first plurality of registers;

first and second address generating circuits outputting addresses based on one of incrementing or decrementing a given address;

first and second storage means storing compressed data read out from a recording medium according to the addresses output by said first and second address generating circuits;

a decoder reading compressed data from a recording medium according to the addresses supplied by said address generating circuit, said decoder decoding said compressed data to provide decompressed data as decoded data and outputting said decompressed data;

an address switching circuit which selects one of an address supplied by said first and second address generating circuit and an address supplied from an external address bus, and outputs said selected address;

a data switching circuit selecting one of data supplied from said recording medium and data supplied by said decoder, and outputting thus-selected data to a data bus;

and, wherein;

said decoder circuit operating in one of two modes, a through mode and a decoding mode, input data being output in input form in said through mode, input compressed data being decoded and said decoded data being output in said decoding mode;

said decoder circuit operating in said through mode when an address is supplied from said external address bus;

said decoder circuit operating in said decoding mode when an address is supplied by one of said first and second address generating circuit, then, in response to start instructions of said plurality of decoding operations, an address for a priority order is set in said first address generating circuit, based on addresses supplied by said first address generating circuits, said compressed data is read out from said recording medium and stored in said fist storage means, said stored data being read and decoded by said decoder, upon said first storage means reaching full capacity, from an address for a priority order subsequent to said priority order, said second address generating circuit supplies addresses, said compressed data being read out from said recording medium according to the supplied addresses and stored in said second storage means, thus, after data of a first specified address has been output a predetermined transfer amount, in a subsequent decompressing operation, said decoder starts reading data of said second storage means, said second address generating circuit generates addresses continuously, compressed data being read out from said recording medium, said read data being stored in said second storage mean, upon said second storage means reaching full capacity, from an address for a subsequent priority order, said first address generating circuit supplies addresses, compressed data being read out from said recording medium according to said supplied addresses and stored in said first storage means.

10. The data decoder circuit according to claim 9, wherein said first and second storage means comprises FIFO memories.

11. The data decoder circuit according to claim 9, wherein said first and second storage means comprises a FIFO memory and a register.

12. A method of operating a data decoder for supplying data from first and second recording areas storing compressed and non-compressed data, respectively, to a device, the data decoder selectively operable in a decoding mode or a through mode in response to a mode control signal, said method comprising steps of:

in the decoding mode, controlling the data decoder for accessing the first recording area to read compressed data, decoding the read compressed data and supplying the decoded data to the device;

determining when the decoder has decoded a predetermined amount of compressed data;

switching the mode control signal to the through mode when it is determined that the decoder has decoded the predetermined amount of compressed data; and in the through mode, controlling the data decoder for accessing and reading the non-compressed data from the second recording area and, without performing any operation on the data read from the second recording area, supplying the data from the second recording area to the device.

* * * * *